US012643446B2

(12) United States Patent
Hong et al.

(10) Patent No.: US 12,643,446 B2
(45) Date of Patent: Jun. 2, 2026

(54) HEADREST POSITION ADJUSTMENT APPARATUS FOR VEHICLE

(71) Applicants: Hyundai Motor Company, Seoul (KR); Kia Corporation, Seoul (KR); Woobo Tech Co., Ltd., Pyeongtaek (KR); Lear Korea Limited Liability Company, Seoul (KR)

(72) Inventors: Suk Won Hong, Bucheon (KR); Seung Hyun Kim, Daejeon (KR); Gil Ju Kim, Hwaseong (KR); Sang Man Seo, Hwaseong (KR); Hae Il Jeong, Incheon (KR); Yong Hwan Kim, Incheon (KR)

(73) Assignees: Hyundai Motor Company, Seoul (KR); Kia Corporation, Seoul (KR); Woobo Tech Co., Ltd., Pyeongtaek (KR); Lear Korea Limited Liability Company, Seoul (KR)

( * ) Notice: Subject to any disclaimer, the term of this patent is extended or adjusted under 35 U.S.C. 154(b) by 230 days.

(21) Appl. No.: 18/530,134

(22) Filed: Dec. 5, 2023

(65) Prior Publication Data

US 2024/0424967 A1 Dec. 26, 2024

(30) Foreign Application Priority Data

Jun. 20, 2023 (KR) ........................ 10-2023-0078654

(51) Int. Cl.
B60N 2/80 (2018.01)
B60N 2/815 (2018.01)
B60N 2/865 (2018.01)

(52) U.S. Cl.
CPC ............. *B60N 2/865* (2018.02); *B60N 2/815* (2018.02)

(58) Field of Classification Search
CPC .......... B60N 2/80; B60N 2/806; B60N 2/865; B60N 2/815
See application file for complete search history.

(56) References Cited

U.S. PATENT DOCUMENTS

| | | | | |
|---|---|---|---|---|
| 6,715,829 | B2 * | 4/2004 | Svantesson | B60N 2/888 |
| | | | | 297/216.12 |
| 10,144,322 | B2 * | 12/2018 | Line | B60N 2/6009 |
| 10,589,650 | B2 * | 3/2020 | Nakamura | B60N 2/853 |
| 11,148,568 | B2 * | 10/2021 | Hong | B60N 2/806 |
| 2015/0130247 | A1 * | 5/2015 | Kondrad | B60N 2/865 |
| | | | | 297/410 |
| 2015/0130248 | A1 * | 5/2015 | Line | B60N 2/821 |
| | | | | 297/410 |
| 2016/0129816 | A1 * | 5/2016 | Lee | B60N 2/853 |
| | | | | 297/409 |
| 2017/0313217 | A1 * | 11/2017 | Line | B60N 2/6009 |
| 2017/0313218 | A1 * | 11/2017 | Line | B60N 2/865 |

(Continued)

*Primary Examiner* — Chi Q Nguyen
(74) *Attorney, Agent, or Firm* — Fox Rothschild LLP

(57) ABSTRACT

A headrest position adjustment apparatus for a vehicle includes a headrest having a headrest pad, a sliding device configured to move the headrest pad in a forward/rearward direction, and a reciprocator configured to move the headrest pad in an upward/downward direction. The headrest position adjustment apparatus is configured to adjust a distance between the head of a passenger and the headrest pad to a desired distance through adjustment of a position of the headrest pad in both the upward/downward direction and the forward/rearward direction.

20 Claims, 33 Drawing Sheets

(56) References Cited

U.S. PATENT DOCUMENTS

| | | | |
|---|---|---|---|
| 2017/0373219 A1* | 12/2017 | Ku | H01L 21/6835 |
| 2019/0061585 A1* | 2/2019 | Nakamura | B60N 2/853 |
| 2019/0359105 A1* | 11/2019 | Kondo | B60N 2/853 |
| 2025/0170937 A1* | 5/2025 | Yu | B60N 2/02246 |

* cited by examiner

HEADREST POSITION ADJUSTMENT APPARATUS FOR VEHICLE

CROSS-REFERENCE TO RELATED APPLICATION

This application claims under 35 U.S.C. § 119 (a) the benefit of Korean Patent Application No. 10-2023-0078654 filed on Jun. 20, 2023, the entire contents of which are incorporated herein by reference.

BACKGROUND

(a) Technical Field

The present disclosure relates to a headrest position adjustment apparatus for a vehicle, more particularly, to the headrest position adjustment apparatus configured to adjust a position of a headrest in both upward/downward and forward/rearward directions.

(b) Description of the Related Art

Generally, a seat for a vehicle includes at least a seat cushion configured to support the head of a passenger when the passenger sits on the seat, a seatback configured to support the back and the waist of the seated passenger, and a headrest configured to support the neck and the head of the seated passenger.

Typically, a pair of stays is connected to a lower portion of the headrest and coupled to the seatback in an inserted state such that the stays may be vertically reciprocated. Adjustment of a height of the headrest may be achieved through insertion of the pair of stays into an inside of the seatback or withdrawal of the pair of stays from the inside of the seatback.

Recently, a mono-post type headrest has been applied to the headrest included in the seat, in order to satisfy various conditions for a vehicle seat, such as provision of various functions, an enhancement in marketability, an elegant exterior design, etc.

The mono-post refers to only one stay that is connected to a lower portion of a headrest, and is coupled to a seatback in an inserted state. In particular, the stay may be vertically reciprocated, regardless of a shape thereof.

However, the mono-post type headrest is manufactured to have a structure only capable of performing a stroke in an upward/downward direction. For this reason, although height adjustment of the headrest according to physical conditions of the passenger is possible, position adjustment of the headrest in a forward/rearward direction is impossible, and thus comfort performance of the headrest may be degraded.

For example, in the case in which a headrest is positioned to be closer to the head of the passenger, the head of the passenger is rapidly supported by the headrest when an accident occurs. In this case, accordingly, safety performance of the headrest is enhanced because load and an injury level applied to the neck of the passenger may be decreased. However, normally, the head of the passenger may be brought into contact with the headrest, and thus may be bent in a forward direction. For this reason, there is a problem in that discomfort may occur, thereby causing comfort performance of the headrest to be degraded.

On the other hand, in the case in which the headrest is positioned to be farther from the head of the passenger, comfort performance of the headrest may be maintained because the head of the passenger is not pressed by the headrest. However, when an accident occurs, it is impossible for the head of the passenger to be rapidly supported by the headrest. In this case, load and an injury level applied to the neck of the passenger are increased, and thus there is a problem in that safety performance of the headrest may be degraded.

To this end, upon designing and manufacturing the mono-post type headrest, it is necessary to reflect a mechanism capable of adjusting a position of the headrest not only in an upward/downward direction, but also in a forward/rearward direction, in accordance with a position of the head of the passenger.

SUMMARY

The present disclosure provides a headrest position adjustment apparatus for a vehicle capable of enhancing comfort performance and support performance of a headrest through adjustment of the distance between the head of a passenger and a headrest pad to a desired distance by configuring the headrest pad, a sliding device configured to move the headrest pad in a forward/rearward direction, and a reciprocator configured to move the headrest pad in an upward/downward direction, to have a serial or parallel arrangement, such that a position of the headrest pad is adjustable not only in the upward/downward direction, but also in the forward/rearward direction.

Objects of the present disclosure are not limited to the above-described objects, and other objects of the present disclosure not yet described will be more clearly understood by those skilled in the art from the following detailed description. In addition, objects of the present disclosure may be accomplished by means defined in the appended claims and combinations thereof.

In one aspect, the present disclosure provides a headrest position adjustment apparatus for a vehicle including a headrest pad device including a pad, and a support frame attached to a back portion of the pad, a reciprocator mounted to a seatback, the support frame configured to reciprocate in an upward/downward direction, and a sliding device mounted between a back portion of the support frame and a front opening portion of the reciprocator, to slidably move the headrest pad device in a forward/rearward direction, wherein the headrest pad device, the sliding device, and the reciprocator are arranged in series.

In a preferred embodiment, the sliding device may include a moving plate including a mounting plate mounted to the support frame, and a sliding plate bent from a lower end of the mounting plate in the rearward direction, a slide hole formed at the sliding plate, multistage tooth grooves formed at one-side inner surface of the slide hole, an upper bracket and a lower bracket vertically stacked while being jointed at opposite ends thereof, to form a slide space receiving the moving plate such that the moving plate is movable forwards and rearwards, ball bearing rails mounted in the slide space at opposite lateral positions of the slide space, to slidably receive opposite ends of the sliding plate, respectively, a ratchet rotatably mounted to the upper bracket under the upper bracket and formed, at a rear end thereof, with an unlocking protrusion, the ratchet being disposed within the slide hole and selectively engaged with one of the multistage tooth grooves, for locking, a fixed plate including an upper plate mounted to a front portion of a reciprocation guide exposed through the front opening portion of the reciprocator, and a lower plate bent from a lower end of the upper plate in the forward direction and mounted to an upper surface of the upper bracket, a ratchet-unlocking plate spring configured to rotate the ratchet in an unlocking direction and rotatably coupled to a rotating pin formed at a lower surface of the sliding plate, and a return spring mounted between the mounting plate of the moving plate and a rear end of the upper bracket, to provide elastic restoring force in a rearward movement direction of the moving plate.

In still another preferred embodiment, the sliding device may further include a first spring connected between the upper bracket and the ratchet, to exert elastic restoring force to rotate the ratchet toward the tooth grooves, and a second spring connected between the rotating pin and the ratchet, to exert elastic restoring force to rotate the ratchet-unlocking plate spring in an outward direction.

In yet another preferred embodiment, the ratchet-unlocking plate spring may have a structure including a slot formed at a rotation center portion of the ratchet-unlocking plate spring, to receive the rotating pin formed at the sliding plate, a pressing groove formed at a middle portion of an inner surface of the ratchet-unlocking plate spring such that the pressing groove is able to overlap with a rearmost one of the multistage tooth grooves, and an unlocking end formed at a rear end portion of the inner surface of the ratchet-unlocking plate spring, to protrude from the rear end portion, such that the unlocking end contacts the unlocking protrusion of the ratchet.

In still yet another preferred embodiment, a rotation restraining protrusion may be formed at a rear end of the ratchet-unlocking plate spring, and an inner hole and an outer hole may be formed at the sliding plate such that the inner hole and the outer hole are vertically arranged while communicating with each other, to selectively receive the rotation restraining protrusion for engagement therewith.

In a further preferred embodiment, an arch surface having an arch shape identical to an arch shape of a front end of the ratchet may be formed at a front end of the slide hole of the sliding plate.

In another further preferred embodiment, a stopper may be mounted to a front end of the upper bracket, to contact a rear surface of the mounting plate of the moving plate.

In yet another further preferred embodiment, the reciprocator may include a fixed guide mounted to an upper portion of a seatback in an inserted state, a mono-post formed, at an upper end thereof, with a plurality of locking grooves spaced apart from one another by a predetermined distance in the upward/downward direction, the mono-post being coupled, at a lower end thereof, to the fixed guide in an inserted state, a reciprocation guide formed with a reciprocation guide hole receiving the upper end of the mono-post, to reciprocate along the mono-post. a locking device mounted to the reciprocation guide, to be selectively separably engaged with one of the locking grooves of the mono-post, and a cover attached to a rear portion and a lower portion of the reciprocation guide, the cover having a structure including an opening formed at a front portion of the cover, to expose the reciprocation guide in the forward direction.

In still yet another further preferred embodiment, the locking device may include a bezel mounted to the reciprocation guide such that the bezel is laterally movable, the bezel having a structure including a through hole allowing the mono-post to extend therethrough, a locking plate mounted to one end of the bezel, to be selectively separably engaged with one of the locking grooves, a third spring connected between another end of the bezel and an outer surface of the reciprocation guide, and an unlocking device mounted to the cover, to forcibly move the bezel in an unlocking direction.

In still yet another further preferred embodiment, the unlocking device may include a button guide fixedly mounted to the cover while having a structure including a pressing guide hole, a button coupled to the button guide in an inserted state such that the button is allowed to be pressed, a pressing end formed at an inner surface of the button such that the pressing end extends through the pressing guide hole and contacts another surface of the bezel, to press the other surface of the bezel, and a fourth spring connected between the inner surface of the button and an outer surface of the button guide.

A vehicle may include the above-described headrest position adjustment apparatus.

In another aspect, the present disclosure provides a headrest position adjustment apparatus for a vehicle including a headrest pad device including a pad, and a support frame attached to a back portion of the pad, a reciprocator mounted to a seatback, the support frame configured to reciprocate in an upward/downward direction, and a sliding device stacked on an upper surface of the reciprocator and mounted between a back portion of the support frame and a front portion of the reciprocator, the sliding device configured to slidably move the headrest pad device in a forward/rearward direction, wherein the headrest pad device, the sliding device, and the reciprocator are arranged in parallel.

In a preferred embodiment, the sliding device may include In a preferred embodiment, a moving plate including a mounting plate mounted to the support frame, and a sliding plate bent from an upper end of the mounting plate in the rearward direction, a slide hole formed at the sliding plate, multistage tooth grooves formed at one-side inner surface of the slide hole, an upper bracket and a lower bracket vertically stacked while being jointed at opposite ends thereof, to form a slide space receiving the moving plate such that the moving plate is movable forwards and rearwards, ball bearing rails mounted in the slide space at opposite lateral positions of the slide space, to slidably receive opposite ends of the sliding plate, respectively, a ratchet rotatably mounted to the upper bracket under the upper bracket and formed, at a rear end thereof, with an unlocking protrusion, the ratchet being disposed within the slide hole and selectively engaged with one of the multistage tooth grooves, for locking, a fixed plate including an upper plate mounted to a lower surface of the lower bracket, and a lower plate bent from a lower end of the upper plate in the downward direction and mounted to a front surface of the reciprocation guide in a stacked state of a rear end of the lower bracket on the reciprocation guide exposed through a front opening portion of the reciprocator, a ratchet-unlocking plate spring configured to rotate the ratchet in an unlocking direction and rotatably coupled to a rotating pin formed at a lower surface of the sliding plate, and a return spring mounted between the mounting plate of the moving plate and the rear end of the lower bracket, to provide elastic restoring force in a rearward movement direction of the moving plate.

In still another preferred embodiment, the sliding device may further include a first spring connected between the upper bracket and the ratchet, to exert elastic restoring force to rotate the ratchet toward the tooth grooves, and a second spring connected between the rotating pin and the ratchet, to exert elastic restoring force to rotate the ratchet-unlocking plate spring in an outward direction.

In yet another preferred embodiment, the ratchet-unlocking plate spring may have a structure including a slot formed at a rotation center portion of the ratchet-unlocking plate spring, to receive the rotating pin formed at the sliding plate, a pressing groove formed at a middle portion of an inner surface of the ratchet-unlocking plate spring such that the pressing groove is able to overlap with a rearmost one of the multistage tooth grooves, and an unlocking end formed at a rear end portion of the inner surface of the ratchet-unlocking plate spring, to protrude from the rear end portion, such that the unlocking end contacts the unlocking protrusion of the ratchet.

In still yet another preferred embodiment, a rotation restraining protrusion may be formed at a rear end of the ratchet-unlocking plate spring, and an inner hole and an outer hole are formed at the sliding plate such that the inner hole and the outer hole are vertically arranged while communicating with each other, to selectively receive the rotation restraining protrusion for engagement therewith.

In a further preferred embodiment, an arch surface having an arch shape identical to an arch shape of a front end of the ratchet may be formed at a front end of the slide hole of the sliding plate.

In another further preferred embodiment, a stopper may be mounted to a front end of the lower bracket, to contact a rear surface of the mounting plate of the moving plate.

In yet another further preferred embodiment, the reciprocator may include a fixed guide mounted to an upper portion of a seatback in an inserted state, a mono-post formed, at an upper end thereof, with a plurality of locking grooves spaced apart from one another by a predetermined distance in the upward/downward direction, the mono-post being coupled, at a lower end thereof, to the fixed guide in an inserted state, a reciprocation guide formed with a reciprocation guide hole receiving the upper end of the mono-post, to reciprocate along the mono-post, a locking device mounted to the reciprocation guide, to be selectively separably engaged with one of the locking grooves of the mono-post, and a cover attached to a rear portion and a lower portion of reciprocation guide, the cover having a structure including an opening formed at a front portion of the cover, to expose the reciprocation guide in the forward direction.

In still yet another further preferred embodiment, the locking device may include a bezel mounted to the reciprocation guide such that the bezel is laterally movable, the bezel having a structure including a through hole allowing the mono-post to extend therethrough, a locking plate mounted to one end of the bezel, to be selectively separably engaged with one of the locking grooves, a third spring connected between another end of the bezel and an outer surface of the reciprocation guide, and an unlocking device mounted to the cover, to forcibly move the bezel in an unlocking direction.

In still yet another further preferred embodiment, the unlocking device may include a button guide fixedly mounted to the cover while having a structure including a pressing guide hole, a button coupled to the button guide in an inserted state such that the button is allowed to be pressed, a pressing end formed at an inner surface of the button such that the pressing end extends through the pressing guide hole and contacts another surface of the bezel, to press the other surface of the bezel, and a fourth spring connected between the inner surface of the button and an outer surface of the button guide.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
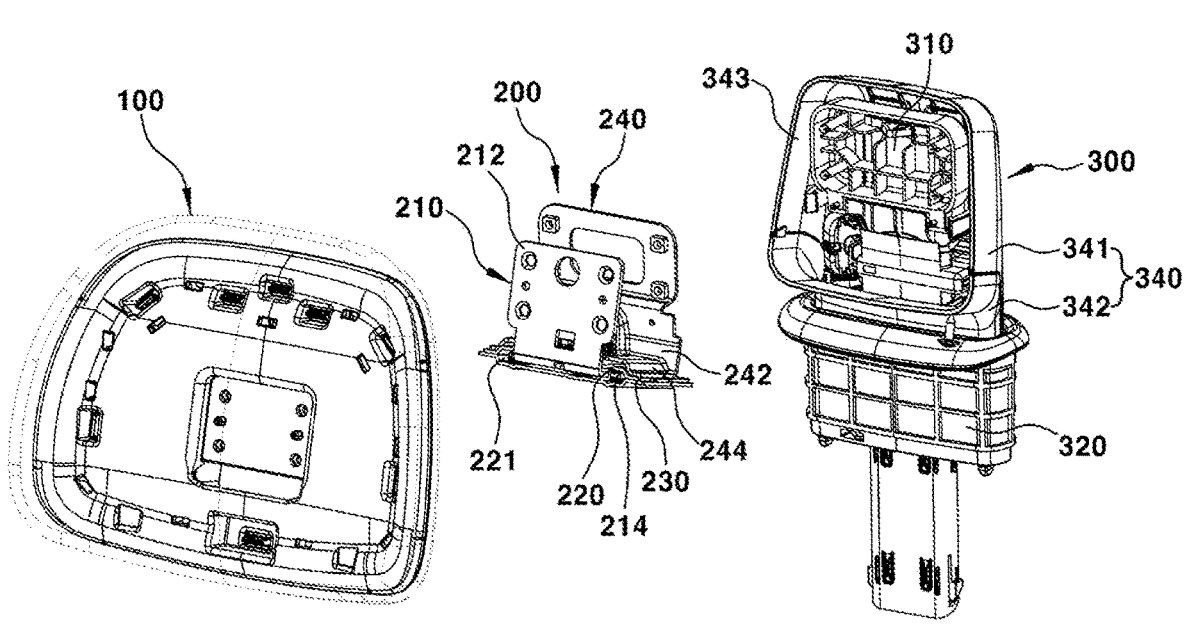
FIG. 1 is an exploded perspective view of a serial type headrest position adjustment apparatus according to an embodiment of the present disclosure, showing an exploded state of a headrest, a sliding device, and a reciprocator.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In additional aspects, vehicles are provided that comprises a seat and seat assembly as disclosed herein.

In further aspects, vehicles are provided that comprises a vehicle seat that includes a power swivel apparatus as disclosed herein.

In further aspects, vehicles are provided that comprise a power swivel apparatus as disclosed herein.

In certain aspects, a present vehicle may be an autonomous vehicle.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

As referred to herein, a mono-post seat assembly or mono-post seat or other similar term refers to a captain's-type vehicle seat rather than a bench-type vehicle seat or seat assembly. In certain aspects, a mono-post vehicle seat may not have a seat-collapsing hinge as provided with a bench-type vehicle seat.

For embodiments of the present disclosure disclosed herein, specific structural or functional descriptions are exemplary to merely describe the embodiments of the present disclosure, and the embodiments of the present disclosure can be implemented in various forms. In addition, the present disclosure should not be interpreted as being limited to the embodiments described in the present specification, and it should be understood that the present disclosure includes all changes, equivalents, or substitutions within the spirit and scope of the present disclosure.

It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element.

In the case where an element is "connected" or "linked" to another element, it should be understood that the element may be directly connected or linked to the other element, or another element may be present therebetween. On the contrary, in the case where an element is "directly connected" or "directly linked" to another element, it should be understood that no other element is present therebetween. Other expressions describing a relation between constituent elements, such as "between˜" and "immediately between˜", or "adjacent to˜" and "directly adjacent to˜" and the like, should be construed in a similar manner.

Throughout the specification, the same reference numerals will refer to the same elements. It should be noted that terms used herein are merely used to describe a specific embodiment, not to limit the present disclosure. Incidentally, unless clearly used otherwise, singular expressions include a plural meaning.

Hereinafter, embodiments of the present disclosure will be described in detail with reference to the accompanying drawings.

FIRST EMBODIMENT

Figure 2:
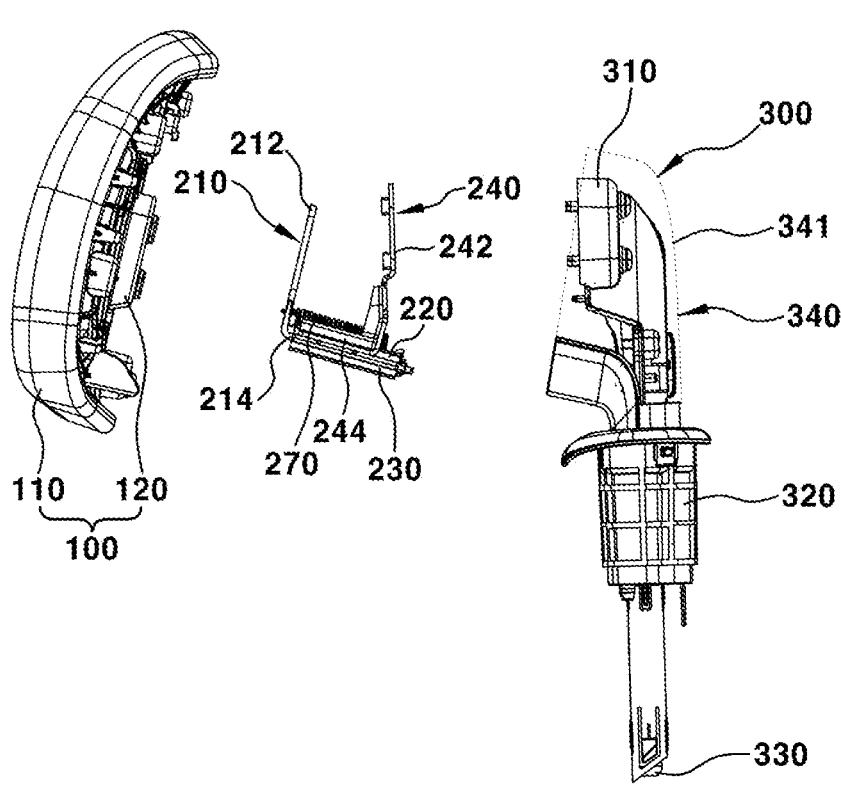
FIG. 2 is a side view of the serial type headrest position adjustment apparatus according to the embodiment of the present disclosure, showing an exploded state of the headrest, the sliding device, and the reciprocator.
Figure 3:
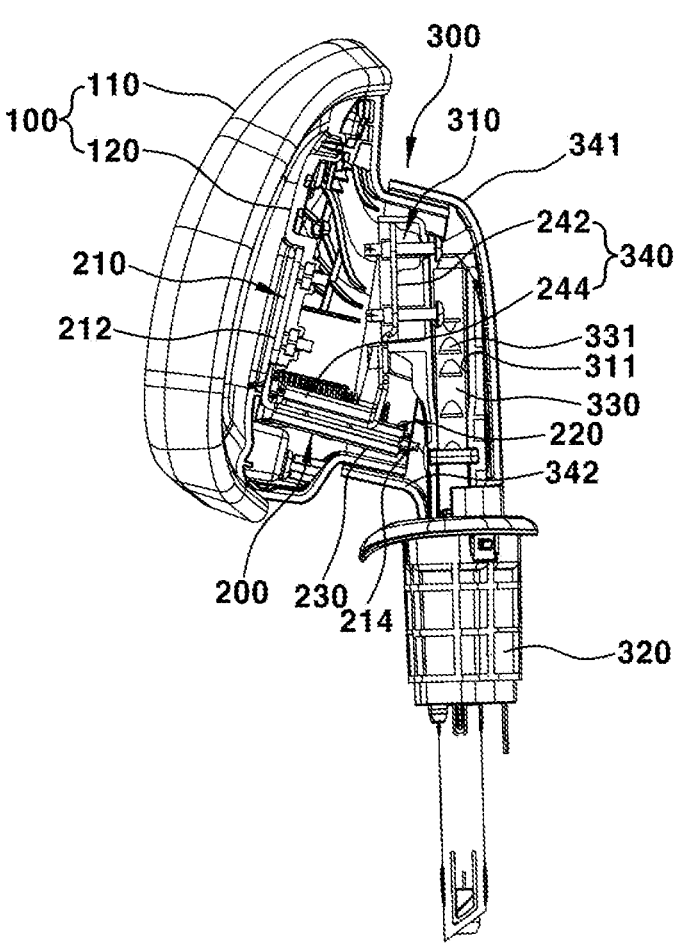
FIG. 3 is a side view of the serial type headrest position adjustment apparatus according to the embodiment of the present disclosure, showing an assembled state of the headrest, the sliding device, and the reciprocator.

FIG. 1 is an exploded perspective view showing a serial type headrest position adjustment apparatus according to an embodiment of the present disclosure. FIGS. 2 and 3 are side views showing the serial type headrest position adjustment apparatus according to the embodiment of the present disclosure.

As shown in FIGS. 1, 2, and 3, the serial type headrest position adjustment apparatus according to the embodiment of the present disclosure is characterized in that the serial type headrest position adjustment apparatus is configured through inclusion of a headrest pad device 100, a sliding device 200 configured to adjust a position of the headrest pad device 100 in a forward/rearward direction, and a reciprocator 300 reciprocally mounted to a seatback, to adjust a height of the headrest pad device 100 in an upward/downward direction, and the headrest pad device 100, the sliding device 200, and the reciprocator 300 are assembled while constituting a serial arrangement in the forward/rearward direction.

The headrest pad device 100 may be constituted by a pad 110 configured to support the head of a passenger, and a support frame 120 attached to a back portion of the pad 110 as a frame of the pad 110.

The sliding device 200 is mounted between a back portion of the support frame 120 of the headrest pad device 100 and a front opening portion of the reciprocator 300 in order to slidably move the headrest pad device 100 in the forward/rearward direction. Accordingly, the headrest pad device 100, the sliding device 200, and the reciprocator 300 are arranged in series in the forward/rearward direction.

The sliding device 200 is configured through inclusion of a moving plate 210 mounted to the headrest pad device 100, an upper bracket 220 and a lower bracket 230 vertically stacked while being jointed at opposite ends thereof such that a slide space 221, into which the moving plate 210 is inserted to be movable forwards and rearwards, is formed between the upper bracket 220 and the lower bracket 230, and a fixed plate 240 fixedly mounted to a front portion of a reciprocation guide 310 exposed through the front opening portion of the reciprocator 300.

In accordance with the above-described configuration, the moving plate 210 moves forwards or rearwards along the slide space 221, thereby causing the headrest pad device 100 to move forwards or rearwards together with the moving plate 210. Thus, position adjustment of the headrest pad device 100 in the forward/rearward direction may be achieved.

Figure 4:
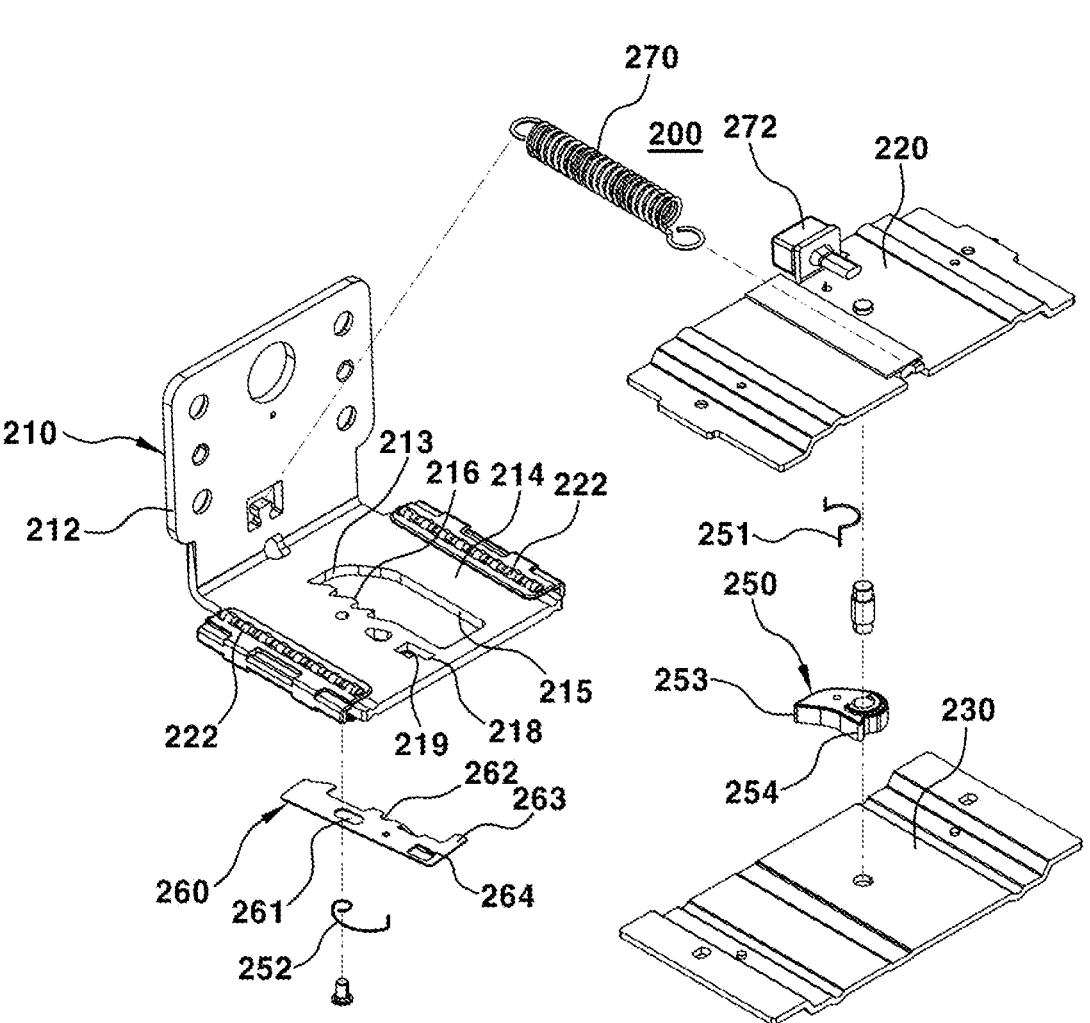
FIG. 4 is an exploded perspective view of the sliding device of the serial type headrest position adjustment apparatus according to the embodiment of the present disclosure.

For this operation, as clearly seen from FIG. 4, the moving plate 210 according to the embodiment of the present disclosure is constituted by a mounting plate 212 mounted to the support frame 120 of the headrest pad device 100, and a sliding plate 214 bent from a lower end of the mounting plate 212 in the rearward direction. In addition, the fixed plate 240 according to the embodiment of the present disclosure is constituted by an upper plate 242 mounted to a front surface of the reciprocation guide 310 exposed through the front opening portion of the reciprocator 300, and a lower plate 244 bent from a lower end of the upper plate 242 in the forward direction and mounted to an upper surface of the upper bracket 220.

Preferably, ball bearing rails 222, into which opposite ends of the sliding plate 214 of the moving plate 210 are slidably inserted, are mounted in a space between the upper bracket 220 and the lower bracket 230, that is, the slide space 221, at opposite lateral positions of the slide space 221, in order to enable smooth sliding movement of the moving plate 210 in the forward/rearward direction.

A slide hole 215, which extends lengthily in the forward/rearward direction, is formed at the sliding plate 214 of the moving plate 210, and multistage tooth grooves 216 are formed at one-side inner surface of the slide hole 215.

In particular, a ratchet 250 is rotatably mounted to the upper bracket 220 under the upper bracket 220, and is disposed within the slide hole 215 of the sliding plate 214, in order to restrain forward/rearward movement of the moving plate 210, thereby locking a position of the moving plate 210.

The ratchet 250 has a structure in which a locking protrusion 253 protruding in one direction is formed at a front end of the ratchet 250, and an unlocking protrusion 254 protruding in the other direction is formed at a rear end of the ratchet 250.

Accordingly, as the ratchet 250 is selectively engaged in one of the multistage tooth grooves 216 in a state in which the ratchet 250 is rotatably disposed within the slide hole 215 of the sliding plate 214, forward/rearward position adjustment of the moving plate 210 may be achieved.

Meanwhile, when it is desired to rearwardly move the headrest pad device 100 to an original position in a state in which the headrest pad device 100 has been adjusted in position through forward movement thereof, unlocking causing the ratchet 250 to be disengaged from the engaged tooth groove 216 should be performed.

For this operation, that is, for unlocking causing the ratchet 250 to be disengaged from the engaged tooth groove 216, a ratchet-unlocking plate spring 260 configured to rotate the ratchet 250 in an unlocking direction is rotatably coupled to a rotating pin 217 formed at a lower surface of the sliding plate 214.

As clearly seen from FIGS. 6A to 6H, the ratchet-unlocking plate spring 260 is fabricated to have a rectangular plate shape, and has a structure in which a slot 261, into which the rotating pin 217 formed at the sliding plate 214 is inserted, is formed at a rotation center portion of the ratchet-unlocking plate spring 260, a pressing groove 262 is formed at a middle portion of an inner surface of the ratchet-unlocking plate spring 260 such that the pressing groove 262 is able to overlap with a rearmost one of the multistage tooth grooves 216, and an unlocking end 263 contacting the unlocking protrusion 254 of the ratchet 250 is formed at a rear end portion of the inner surface of the ratchet-unlocking plate spring 260, to protrude from the rear end portion.

In addition, a rotation restraining protrusion 264 is formed at a rear end of the ratchet-unlocking plate spring 260, and an inner hole 218 and an outer hole 219, into which the rotation restraining protrusion 264 is selectively inserted for engagement therewith, are formed at the sliding plate 214 such that the inner hole 218 and the outer hole 219 are vertically arranged while communicating with each other.

In this case, the inner hole 218 is formed to extend linearly in the forward/rearward direction, and the outer hole 219 is formed to extend linearly in a lateral direction, and, as such, the inner hole 218 and the outer hole 219 communicate with each other while being vertically arranged.

Meanwhile, an arch surface 213 having an arch shape similar to that of the front end of the ratchet 250 is formed at a front end of the slide hole 215 of the sliding plate 214. Accordingly, when the sliding plate 214 moves rearwards, a curved surface of the front end of the ratchet 250 is brought into contact with the arch surface 213, thereby guiding downward rotation of the ratchet 250. As a result, the locking protrusion 253 of the ratchet 250 is again inserted into a foremost one of the multistage tooth grooves 216.

Preferably, a first spring 251 configured to exert elastic restoring force to rotate the ratchet 250 toward the tooth grooves 216 is connected between the upper bracket 220 and the ratchet 250, and a second spring 252 configured to exert elastic restoring force to rotate the ratchet-unlocking plate spring 260 in an outward direction toward the outer hole 219 is connected between the rotating pin 217 of the sliding plate 214 and the ratchet 250.

In addition, a return spring 270 configured to provide elastic restoring force in the rearward direction when the moving plate 210 moves in the rearward direction together with the headrest pad device 100 is connected between the mounting plate 212 of the moving plate 210 and a rear end of the upper bracket 220. Accordingly, the moving plate 210 may be rapidly moved to a rearmost position by the elastic restoring force of the return spring 270.

Preferably, a stopper 272 configured to contact a rear surface of the mounting plate 212 of the moving plate 210 is mounted to a front end of the upper bracket 220. Accordingly, when the moving plate 210 moves rearwards to the rearmost position, the mounting plate 212 is brought into contact with the stopper 272 in an impact-dampened manner. Thus, the maximum rearward movement distance of the moving plate 210 is limited, and impact generated when the moving plate 212 moves rearwards may be dampened.

Hereinafter, operation flow of the serial type headrest position adjustment apparatus according to the embodiment of the present disclosure for forward/rearward position adjustment of the headrest will be described.

Figure 5:
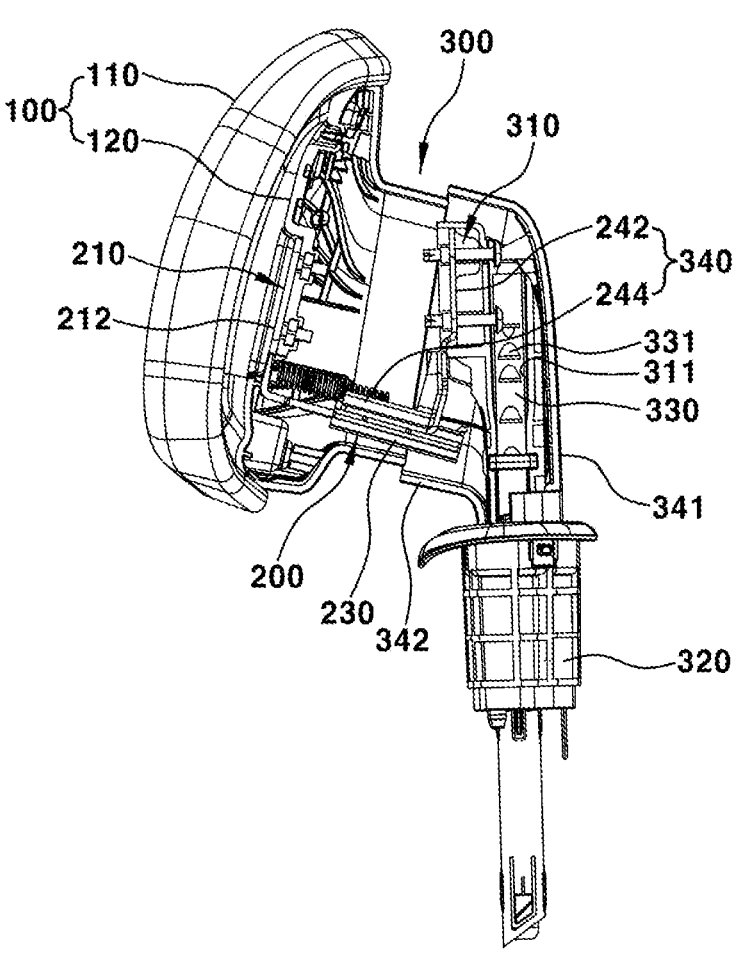
FIG. 5 is a side view showing a state in which a position of the headrest is adjusted to shift forwards by the serial type headrest position adjustment apparatus according to the embodiment of the present disclosure.

FIG. 5 is a side view showing a state in which a position of the headrest is adjusted to shift forwards by the serial type headrest position adjustment apparatus according to the embodiment of the present disclosure. FIGS. 6A to 6H are plan views showing operation flow of the sliding device when the headrest of the serial type headrest position adjustment apparatus according to the embodiment of the present disclosure is adjusted in position in the forward or rearward direction.

As described above, the mounting plate 212 of the moving plate 210 is in a state of being mounted to the support frame 120 of the headrest pad device 100 and, as such, the headrest pad device 100 and the moving plate 210 may simultaneously move forwards or rearwards.

Figure 6A:
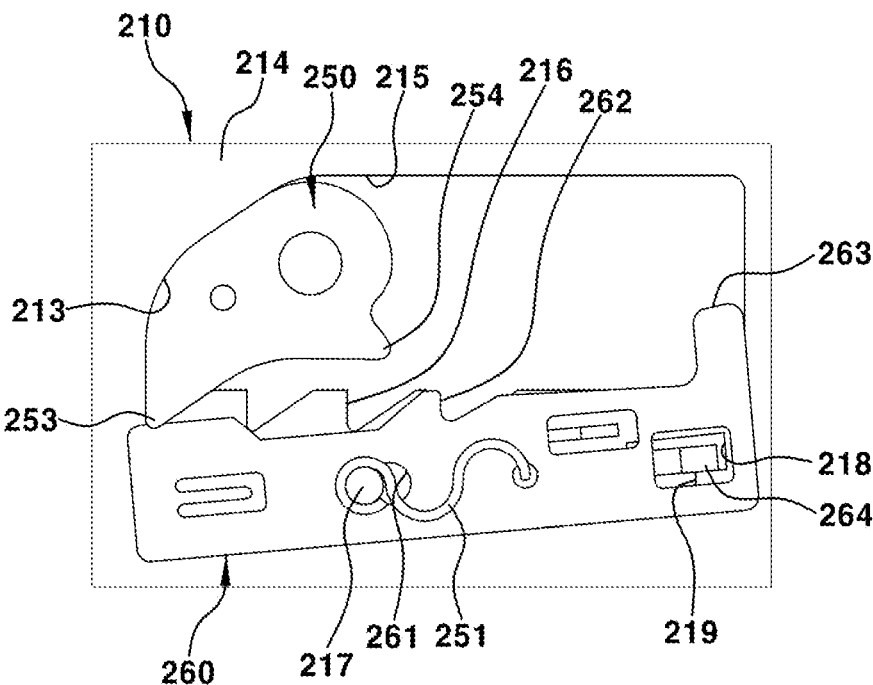
FIGS. 6A to 6H are plan views showing operation flow of the sliding device when the headrest of the serial type headrest position adjustment apparatus according to the embodiment of the present disclosure is adjusted in position in a forward or rearward direction.

Referring to FIG. 6A, when the headrest pad device 100 and the moving plate 210 move maximally rearwardly, the locking protrusion 253 of the ratchet 250 is inserted into the foremost one of the multistage tooth grooves 216, and is maintained in the inserted state.

In this case, the rotation restraining protrusion 264 formed at a rear end of the ratchet-unlocking plate spring 260 is inserted into the inner hole 218 formed at the sliding plate 214 and, as such, the ratchet-unlocking plate spring 260 is disposed in a state of being inclined at a predetermined angle.

Figure 6B:
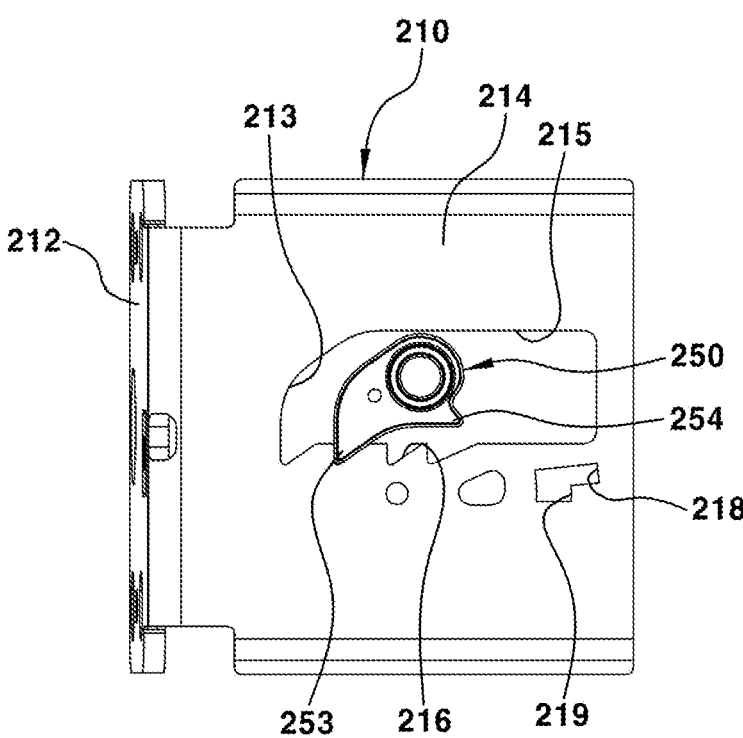
Figure 6C:
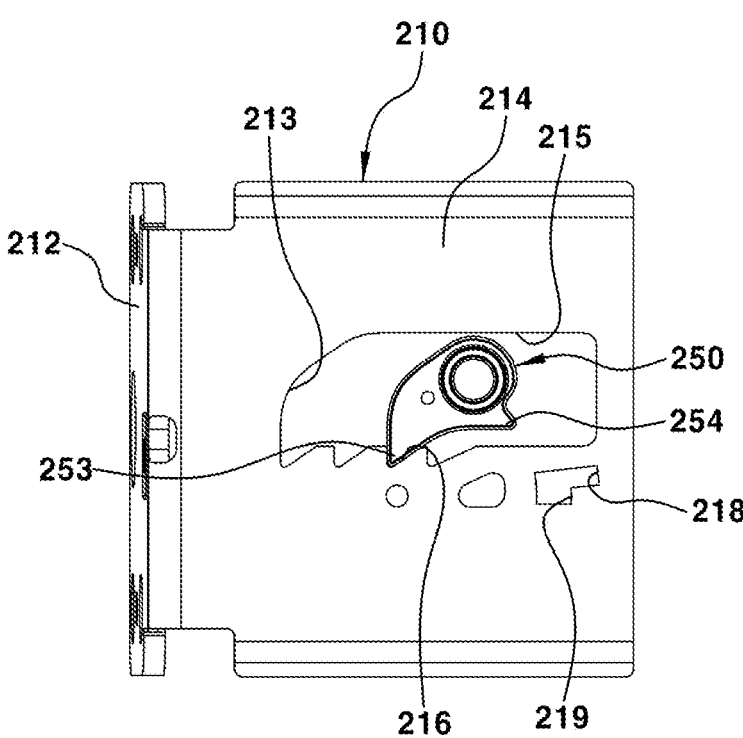
Figure 6D:
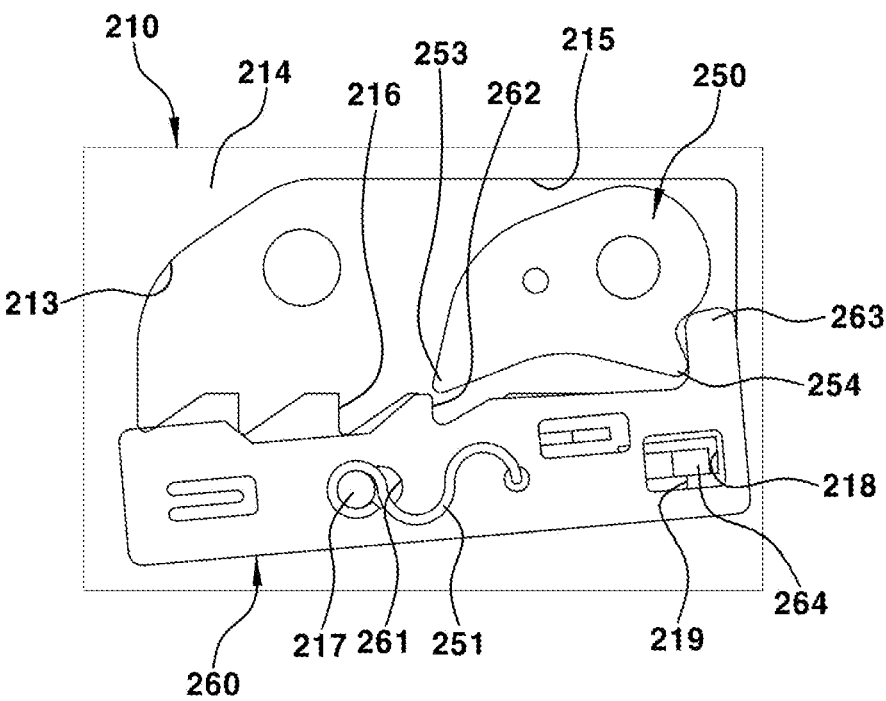

When the user subsequently pulls the headrest pad device 100 in the forward direction, the locking protrusion 253 of the ratchet 250 is sequentially moved from the foremost one of the multistage tooth grooves 216 to next ones of the multistage tooth grooves 216, as shown in FIGS. 6B and 6C. Thus, forward movement of the headrest pad device 100 is achieved.

In addition, when the user maximally pulls the headrest pad device 100 in the forward direction, the unlocking protrusion 254 of the ratchet 250 is brought into contact with the unlocking end 263 of the ratchet-unlocking plate spring 260, thereby causing the ratchet 250 to rotate in a clockwise direction (with reference to the orientation of FIG. 6D) by a predetermined angle. As a result, a curved surface of the rear end of the ratchet 250 is engaged with a tip of the unlocking end 263, thereby preventing the ratchet 250 from rotating beyond the predetermined angle.

Figure 6E:
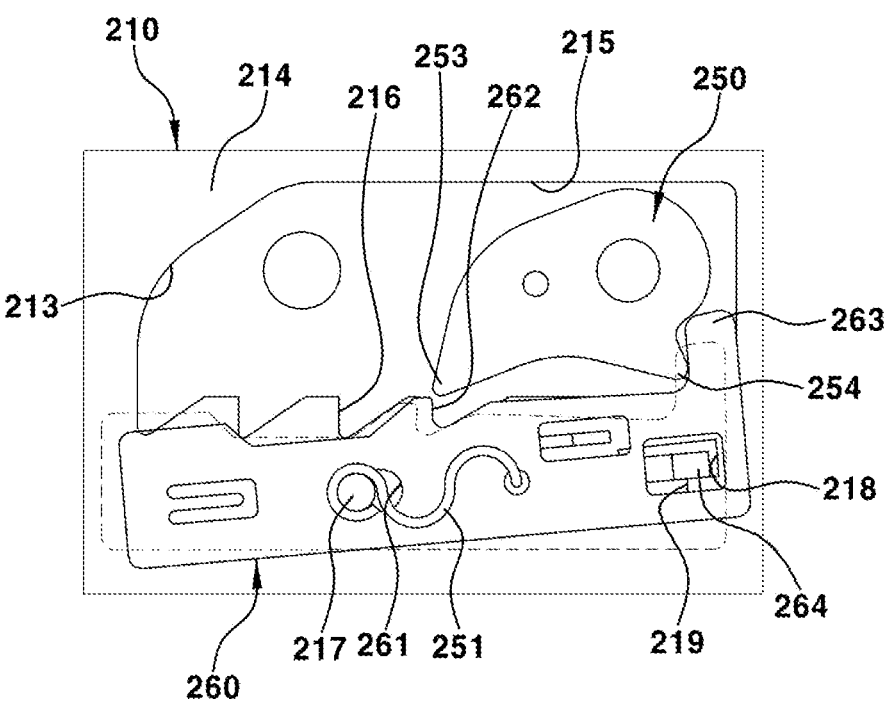

After the ratchet 250 rotates in the clockwise direction by the predetermined angle, the ratchet 250 subsequently again rotates in a counterclockwise direction by elastic restoring force of the first spring 251. As a result, the locking protrusion 253 of the ratchet 250 is inserted into the rearmost one of the multistage tooth grooves 216, and, at the same time, is inserted into the pressing groove 262 of the ratchet-unlocking plate spring 260, as shown in FIG. 6E.

When the locking protrusion 253 of the ratchet 250 is inserted into the pressing groove 262 of the ratchet-unlocking plate spring 260, as described above, the locking protrusion 253 pushes the ratchet-unlocking plate spring 260 in the forward direction. As a result, the rotating pin 217 formed at the sliding plate 214 is moved rearwards along the slot 216 formed at the rotation center portion of the ratchet-unlocking plate spring 260, and the rotation restraining protrusion 264 formed at the rear end of the ratchet-unlocking plate spring 260 is separated from the inner hole 218 formed at the sliding plate 214, and is then inserted into the outer hole 219, as shown in FIGS. 6E and 6F.

Figure 6F:
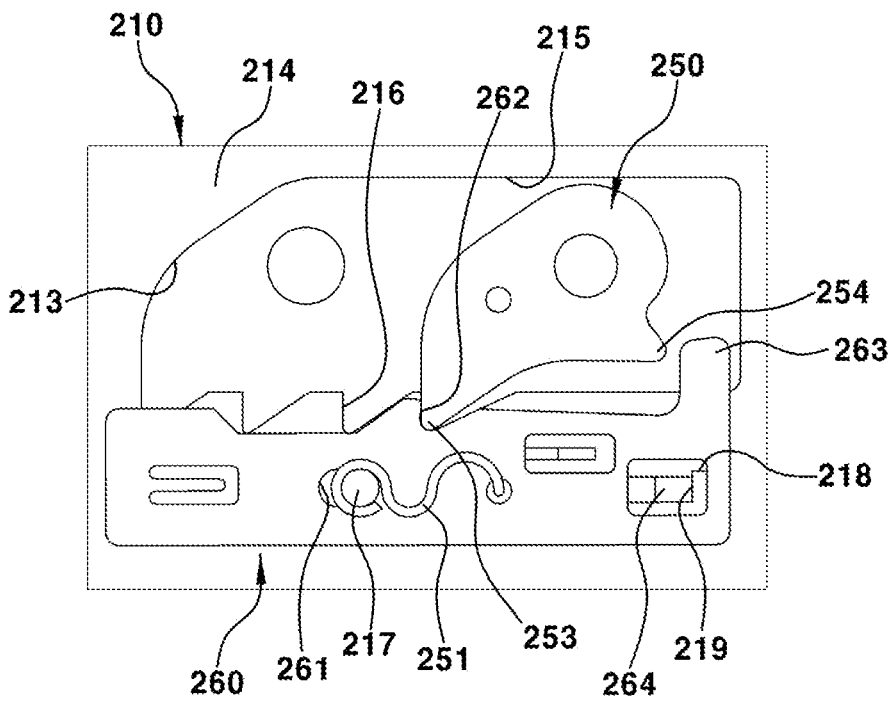

As the rotation restraining protrusion 264 of the ratchet-unlocking plate spring 260 is inserted into the outer hole 219 after being separated from the inner hole 218 of the sliding plate 214, as described above, the ratchet-unlocking plate spring 260 rotates in the clockwise direction by a predetermined angle and, as such, is linearly disposed in the forward/rearward direction without inclination, as shown in FIG. 6F.

In addition, as the locking protrusion 253 of the ratchet 250 is inserted into the rearmost one of the multistage tooth grooves 216, the position of the headrest pad device 100 is in a state of being adjusted to a foremost position, and the return spring 270 connected between the mounting plate 212 of the moving plate 210 and the rear end of the upper bracket 220 is in a maximally tensed state.

Meanwhile, when it is desired to move the headrest pad device 100 rearwards to an original position, unlocking causing the locking protrusion 253 of the ratchet 250 to be disengaged from the engaged tooth groove 216 should be performed.

Figure 6G:
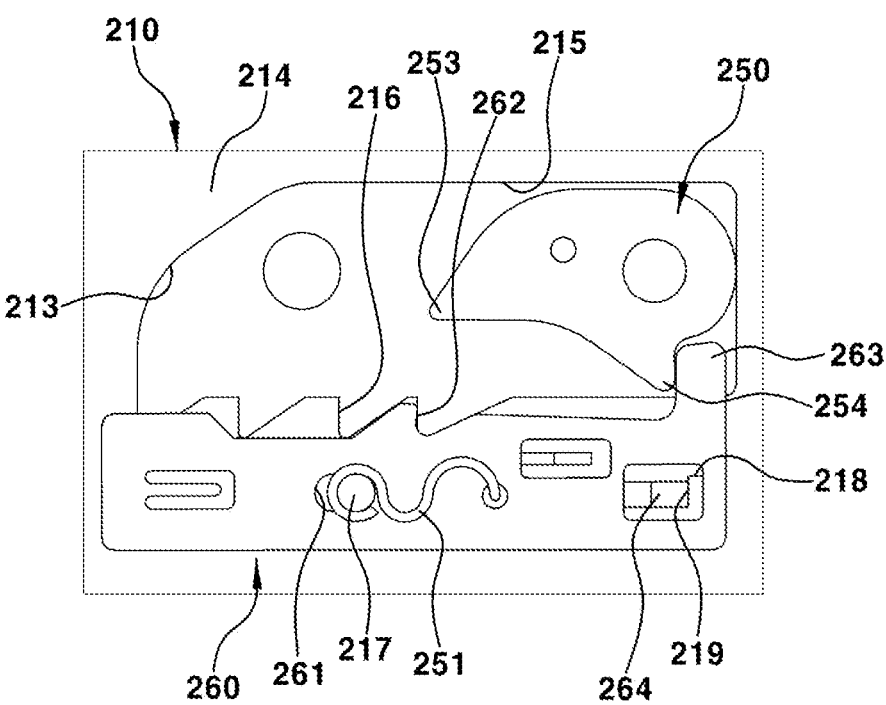

For this operation, the user again maximally pulls in the forward direction and, as such, the moving plate 210 and the ratchet-unlocking plate spring 260 move maximally in the forward direction, together with the headrest pad device 100. In this case, the unlocking end 263 of the ratchet-unlocking plate spring 260 pushes the unlocking protrusion 254 of the ratchet 250 in the forward direction. As a result, as shown in FIG. 6G, the ratchet 250 rotates maximally in the clockwise direction and, as such, unlocking causing the locking protrusion 253 of the ratchet 250 to be disengaged from the rearmost one of the multistage tooth grooves 216 is achieved.

When the user subsequently pushes the headrest pad device 100 in the rearward direction, the headrest pad device 100 and the moving plate 210 may return to the original positions thereof, that is, the rearmost positions thereof, respectively.

In more detail, the headrest pad device 100 and the moving plate 210 may rapidly move rearwards to the original positions thereof, that is, the rearmost positions thereof, respectively, before the locking protrusion 253 of the ratchet 250 is inserted into one tooth groove 216, by virtue of force of the user pushing the headrest pad device 100 in the rearward direction and elastic restoring force of the return spring 270.

Figure 6H:
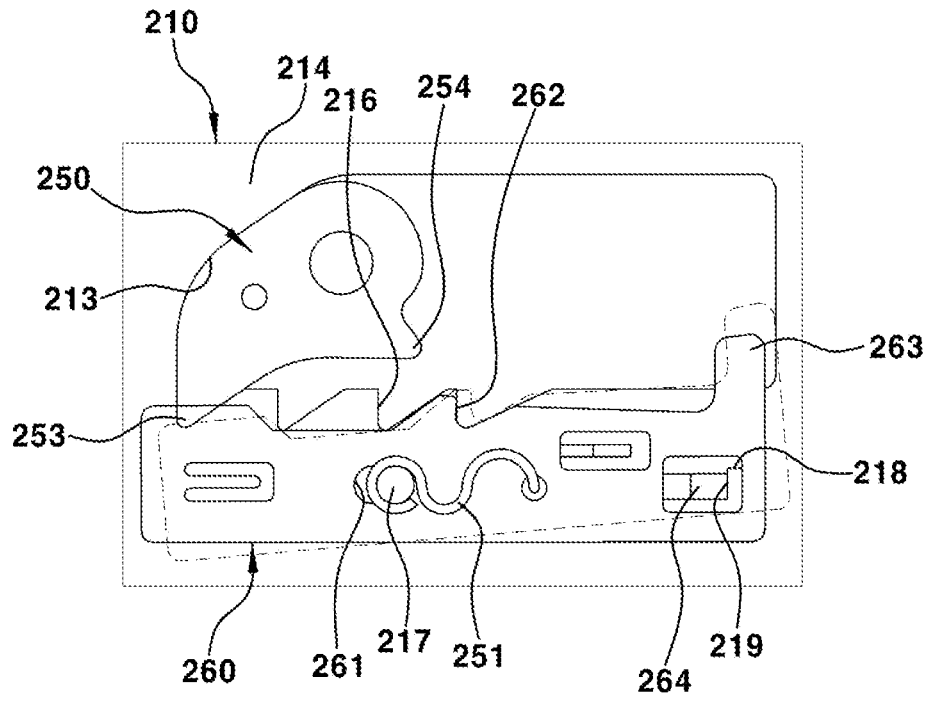

When the headrest pad device 100 and the moving plate 210 return to the original positions thereof, that is, the rearmost positions thereof, respectively, as described above, the curved surface of the front end of the ratchet 250 is brought into contact with the arch surface 213 of the sliding plate 214, thereby guiding downward rotation of the ratchet 250, as shown in FIG. 6H. In addition, the locking protrusion 253 of the ratchet 250 may be again inserted into the foremost one of the multistage tooth grooves 216.

In addition, when the locking protrusion 253 of the ratchet 250 may be again inserted into the foremost one of the multistage tooth grooves 216, the locking protrusion 253 downwardly presses the front end of the ratchet-unlocking plate spring 260, thereby causing the ratchet-unlocking plate spring 260 to rotate about the rotating pin 217 in the counterclockwise direction. As a result, the rotation restraining protrusion 264 of the ratchet-unlocking plate spring 260 is separated from the outer hole 219 of the sliding plate 214, and is then again inserted into the inner hole 218.

As the rotation restraining protrusion 264 of the ratchet-unlocking plate spring 260 is again inserted into the inner hole 218 of the sliding plate 214 after being separated from the outer hole 219 of the sliding plate 214, as described above, the ratchet-unlocking plate spring 260 is again disposed in a state of being inclined by the predetermined angle.

Thus, the distance between the head of the passenger and the headrest pad may be adjusted to a desired distance through adjustment of the position of the headrest pad device 100 not only in the upward/downward direction, but also in the forward/rearward direction, and, as such, it may be possible to enhance comfort performance and support performance of the headrest.

Hereinafter, a configuration and operation flow of the reciprocator of the serial type headrest position adjustment apparatus according to the embodiment of the present disclosure will be described with reference to FIGS. 7A to 10.

Figure 7A:
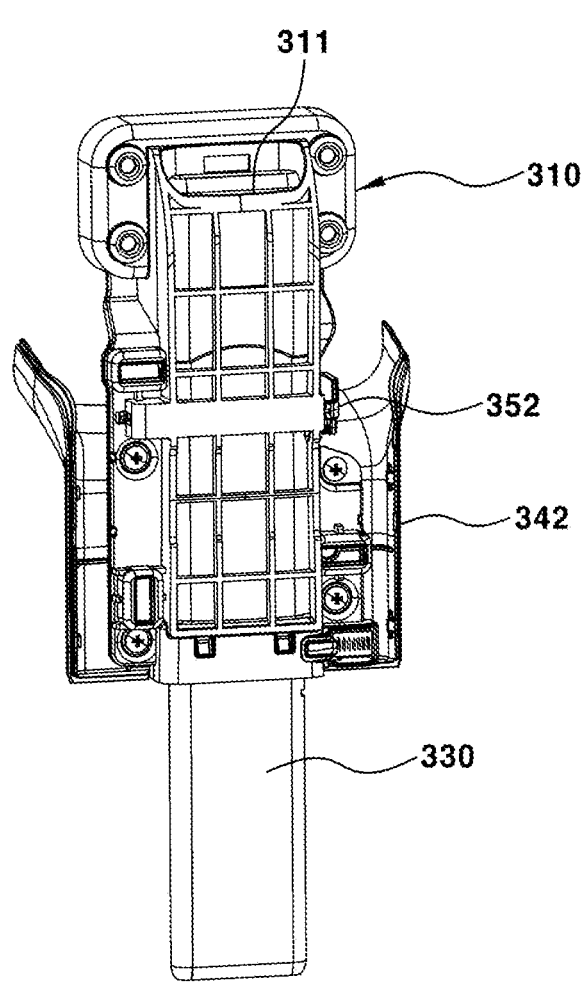
FIGS. 7A and 7B are exploded perspective views showing the reciprocator of the serial type headrest position adjustment apparatus according to the embodiment of the present disclosure.
Figure 7B:
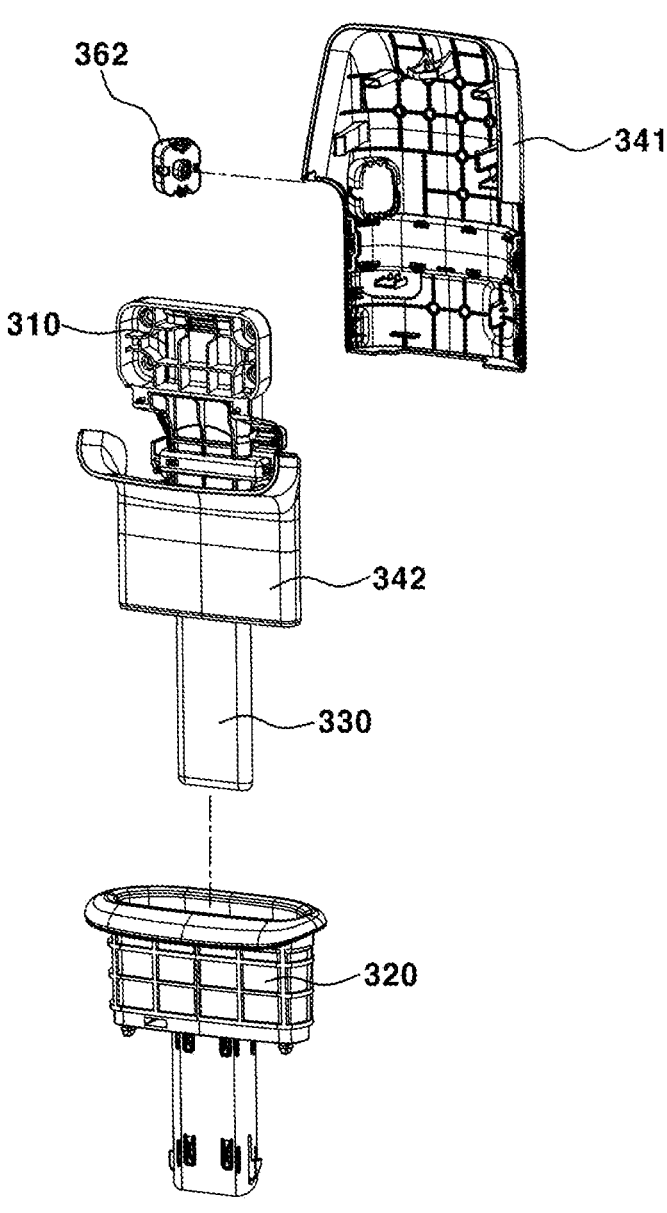

The reciprocator 300 is configured to adjust a vertical height of the headrest pad device 100. As shown in FIGS. 7A and 7B, the reciprocator 300 is configured through inclusion of a hollow fixed guide 320 mounted to an upper portion of the seatback in an inserted state, a mono-post 330 fixedly coupled to the fixed guide 320 in an inserted state, a reciprocation guide 310 configured to reciprocate along the mono-post 330, and a cover 340 attached to a rear portion and a lower portion of the reciprocation guide 310.

A plurality of locking grooves 331 is formed at an upper end of the mono-post 330 such that the locking grooves 331 are spaced apart from one another by a predetermined distance in the upward/downward direction. A lower end of the mono-post 330 is coupled to the fixed guide 320 in an inserted state.

As shown in FIG. 7A, a reciprocation guide hole 311, into which the upper end of the mono-post 330 is inserted, is formed at the reciprocation guide 310 such that the reciprocation guide hole 311 extends through the reciprocation guide 310 in the upward/downward direction. Accordingly, the reciprocation guide 310 may reciprocate along the mono-post 330.

The cover 340 has a structure covering the rear portion and the lower portion of the reciprocation guide 310 while having a structure in which an opening 343 exposing the reciprocation guide 310 in the forward direction is formed at a front portion of the cover 340.

For example, as shown in FIG. 7B, the cover 340 includes a rear cover 341 attached to the rear portion of the reciprocation guide 310, and a front cover 342 attached to the lower portion of the reciprocation guide 310. In a state in which the rear cover 341 is attached to the rear portion of the reciprocation guide 310, and the front cover 342 is attached to the lower portion of the reciprocation guide 310, the opening 343 exposing the reciprocation guide 310 in the forward direction may be formed at front portions of the rear cover 341 and the front cover 342, as shown in FIGS. 1 and 2.

In addition, the reciprocator 300 is configured through further inclusion of a locking device 350 configured to be selectively separably engaged with one of the locking grooves 331 of the mono-post 330.

As shown in FIGS. 7A to 9, the locking device 350 may be configured through inclusion of a bezel 352 formed with a through hole 351, through which the mono-post 330 extends, and mounted to the reciprocation guide 310 in an inserted state such that the bezel 352 is laterally movable, a locking plate 353 selectively separably engaged with one of the locking grooves 331 of the mono-post 330, a third spring 354 connected between the other end of the bezel 352 and an outer surface of the reciprocation guide 310, and an unlocking device 360 mounted to the cover 340 and configured to forcibly move the bezel 352 in an unlocking direction.

Figure 8:
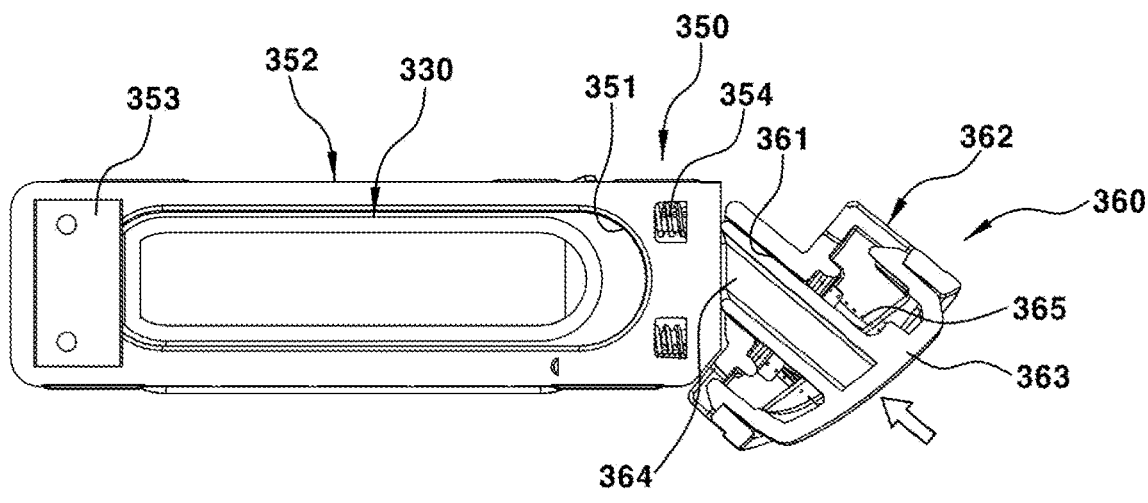
FIG. 8 is a sectional view showing a locking state of the reciprocator of the serial type headrest position adjustment apparatus according to the embodiment of the present disclosure.
Figure 9:
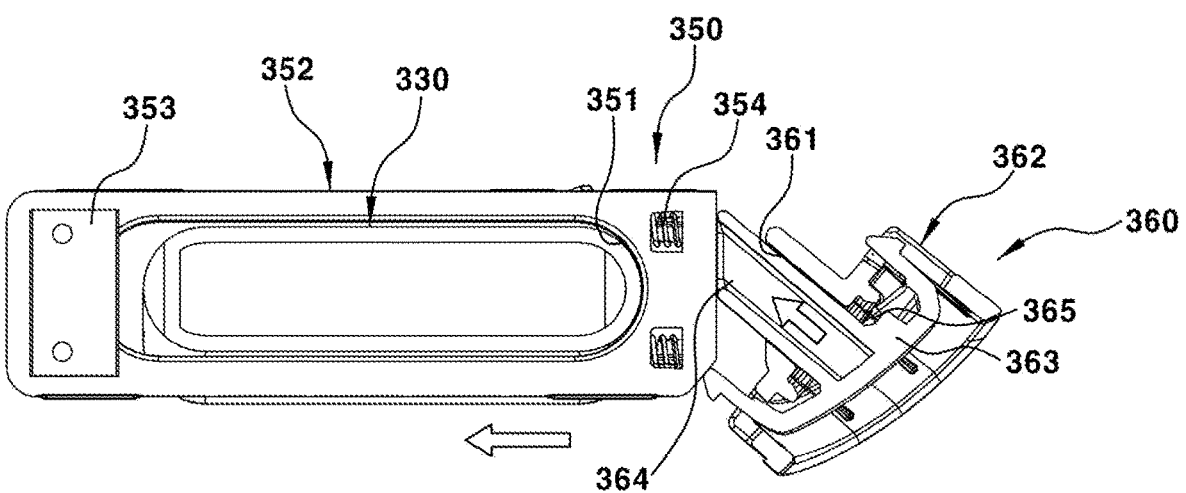
FIG. 9 is a sectional view showing an unlocking state of the reciprocator of the serial type headrest position adjustment apparatus according to the embodiment of the present disclosure.

In addition, as shown in FIGS. 8 and 9, the unlocking device 360 may be constituted by a button guide 362 fixedly mounted to the cover 340 while having a structure formed with a pressing guide hole 361, a button 363 coupled to the button guide 362 in an inserted state such that the button 363 is allowed to be pressed, a pressing end 364 formed at an inner surface of the button 363 such that the pressing end 364 extends through the pressing guide hole 361 and contacts the other surface of the bezel 352, to press the other surface of the bezel 352, and a fourth spring 365 connected between the inner surface of the button 363 and an outer surface of the button guide 362.

In this case, the button 363 may be disposed at a predetermined position of the cover 340 such that the button 363 is allowed to be pressed.

Accordingly, when the user presses the button 363 in order to adjust a height of the headrest pad device 100, the pressing end 364 formed with the button 363 at the inner surface thereof moves forwards along the pressing guide hole 361 of the button guide 362, thereby pressing the other surface of the bezel 352, as shown in FIG. 8.

When the pressing end 364 presses the other surface of the bezel 352, the bezel 352 is moved in the unlocking direction, and, at the same time, the locking plate 353 is separated from one of the locking grooves 331 of the mono-post 330, as shown in FIG. 9.

When the user subsequently performs manipulation for moving the headrest pad device 100 in the upward direction or the downward direction, height adjustment of the headrest pad device 100 may be achieved.

Figure 10:
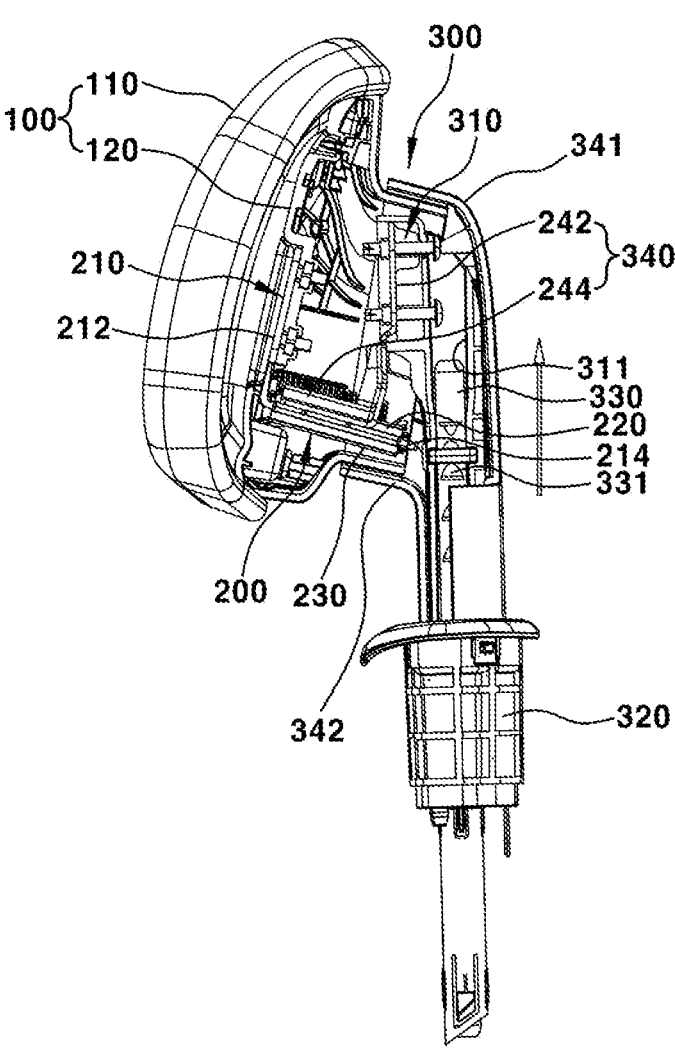
FIG. 10 is a side view showing a state in which a position of the headrest is adjusted to shift upwards by of the serial type headrest position adjustment apparatus according to the embodiment of the present disclosure.

In more detail, as the user subsequently performs manipulation for moving the headrest pad device 100 in the upward direction or the downward direction, the reciprocation guide 310 reciprocates along the mono-post 330 and, as such, the sliding device 200 connected to the reciprocation guide 210 and the headrest pad device 100 connected to the sliding device 200 may simultaneously reciprocate, as shown in FIG. 10. Accordingly, height adjustment of the headrest pad device 100 may be easily achieved.

Of course, when pressing force of the user applied to the button 363 is released, the button 363 is moved backwards to an original position thereof by elastic restoring force of the fourth spring 365, and the bezel 352 is moved in a locking direction by elastic restoring force of the third spring 354. As a result, the locking plate 352 is engaged with one of the locking grooves 331 of the mono-post 330 such that the locking plate 352 may be locked and, as such, the headrest pad device 100 is again locked at a desired height.

Thus, the height of the headrest pad device 100 is adjusted to a height at which the headrest pad device 100 easily supports the head of the passenger through adjustment of the position of the headrest pad device 100 not only in the upward/downward direction, but also in the forward/rearward direction, and, as such, it may be possible to enhance comfort performance and support performance of the headrest.

SECOND EMBODIMENT

Figure 11:
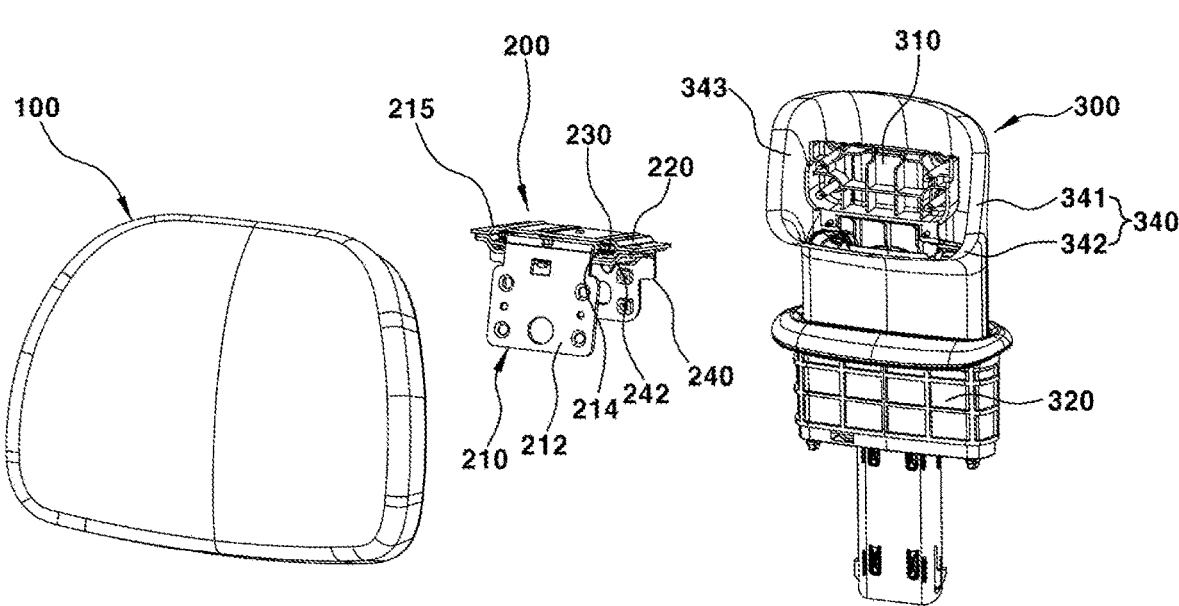
FIG. 11 is an exploded perspective view of a parallel type headrest position adjustment apparatus according to another embodiment of the present disclosure, showing an exploded state of a headrest, a sliding device, and a reciprocator.
Figure 12:
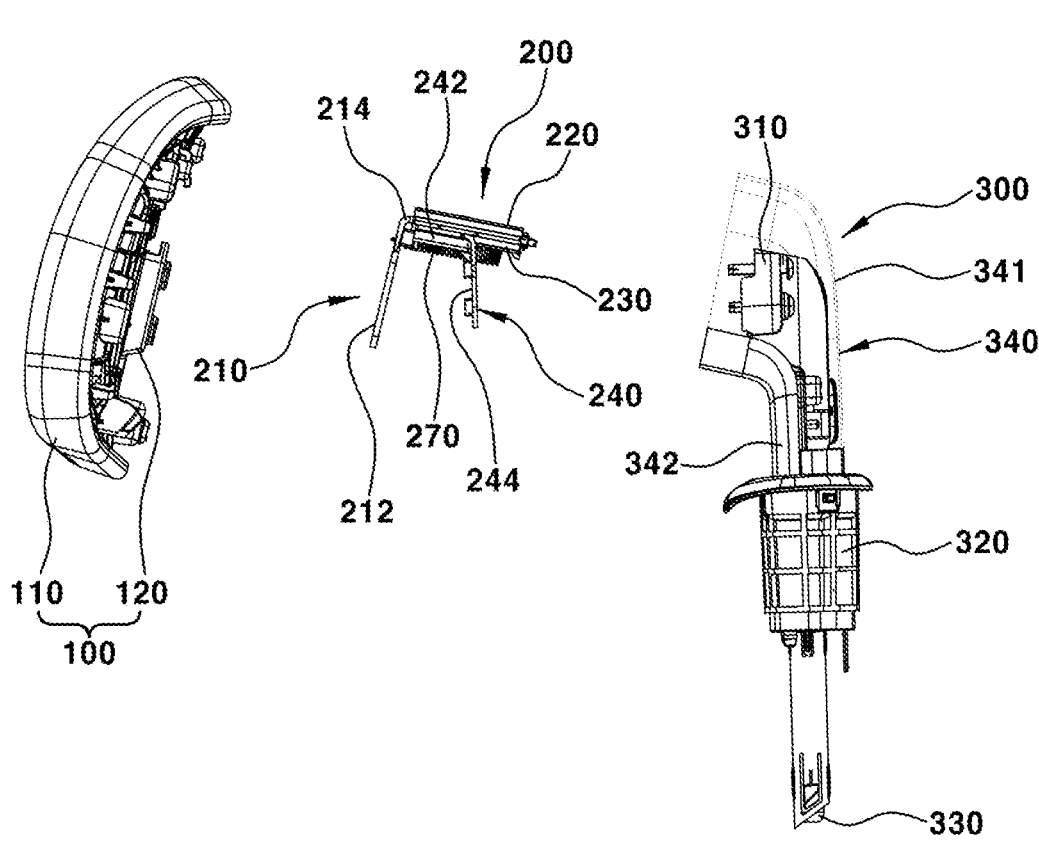
FIG. 12 is a side view of the parallel type headrest position adjustment apparatus according to the other embodiment of the present disclosure, showing an exploded state of the headrest, the sliding device, and the reciprocator.
Figure 13:
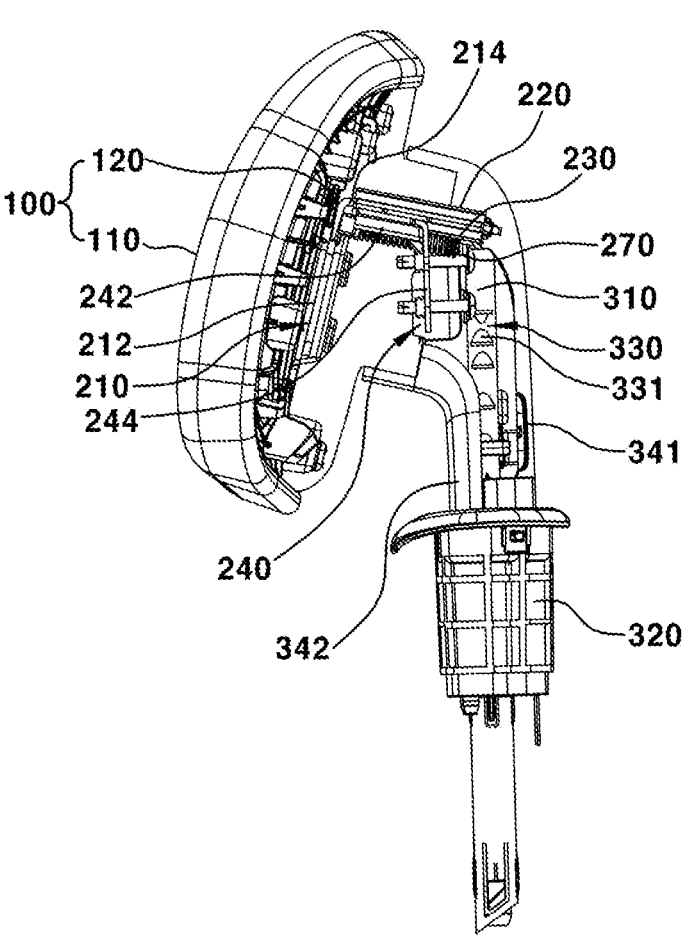
FIG. 13 is a side view of the parallel type headrest position adjustment apparatus according to the other embodiment of the present disclosure, showing an assembled state of the headrest, the sliding device, and the reciprocator.

FIG. 11 is an exploded perspective view showing a parallel type headrest position adjustment apparatus according to another embodiment of the present disclosure. FIGS. 12 and 13 are side views showing the parallel type headrest position adjustment apparatus according to the other embodiment of the present disclosure.

As shown in FIGS. 11, 12, and 13, the parallel type headrest position adjustment apparatus according to the other embodiment of the present disclosure is characterized in that the parallel type headrest position adjustment apparatus is configured through inclusion of a headrest pad device 100, a sliding device 200 configured to adjust a position of the headrest pad device 100 in a forward/rearward direction, and a reciprocator 300 reciprocally mounted to a seatback, to adjust a height of the headrest pad device 100 in an upward/downward direction, and the sliding device 200 and the reciprocator 300, which are mounted to the headrest pad device 100, are assembled while constituting a parallel arrangement in the forward/rearward direction.

The headrest pad device 100 may be constituted by a pad 110 configured to support the head of a passenger, and a support frame 120 attached to a back portion of the pad 110 as a frame of the pad 110.

The sliding device 200 is mounted between a back portion of the support frame 120 and a front portion of the reciprocator 300 and stacked on an upper surface of the reciprocator 300 in order to slidably move the headrest pad device 100 in the forward/rearward direction. Accordingly, the headrest pad device 100, the sliding device 200, and the reciprocator 300 are arranged in parallel in the forward/rearward direction.

The sliding device 200 is configured through inclusion of a moving plate 210 mounted to the headrest pad device 100, an upper bracket 220 and a lower bracket 230 vertically stacked while being jointed at opposite ends thereof such that a slide space 221, into which the moving plate 210 is inserted to be movable forwards and rearwards, is formed between the upper bracket 220 and the lower bracket 230, and a fixed plate 240 fixedly mounted to a front portion of a reciprocation guide 310 exposed through a front opening portion of the reciprocator 300.

In accordance with the above-described configuration, the moving plate 210 moves forwards or rearwards along the slide space 221, thereby causing the headrest pad device 100 to move forwards or rearwards together with the moving plate 210. Thus, position adjustment of the headrest pad device 100 in the forward/rearward direction may be achieved.

Figure 14:
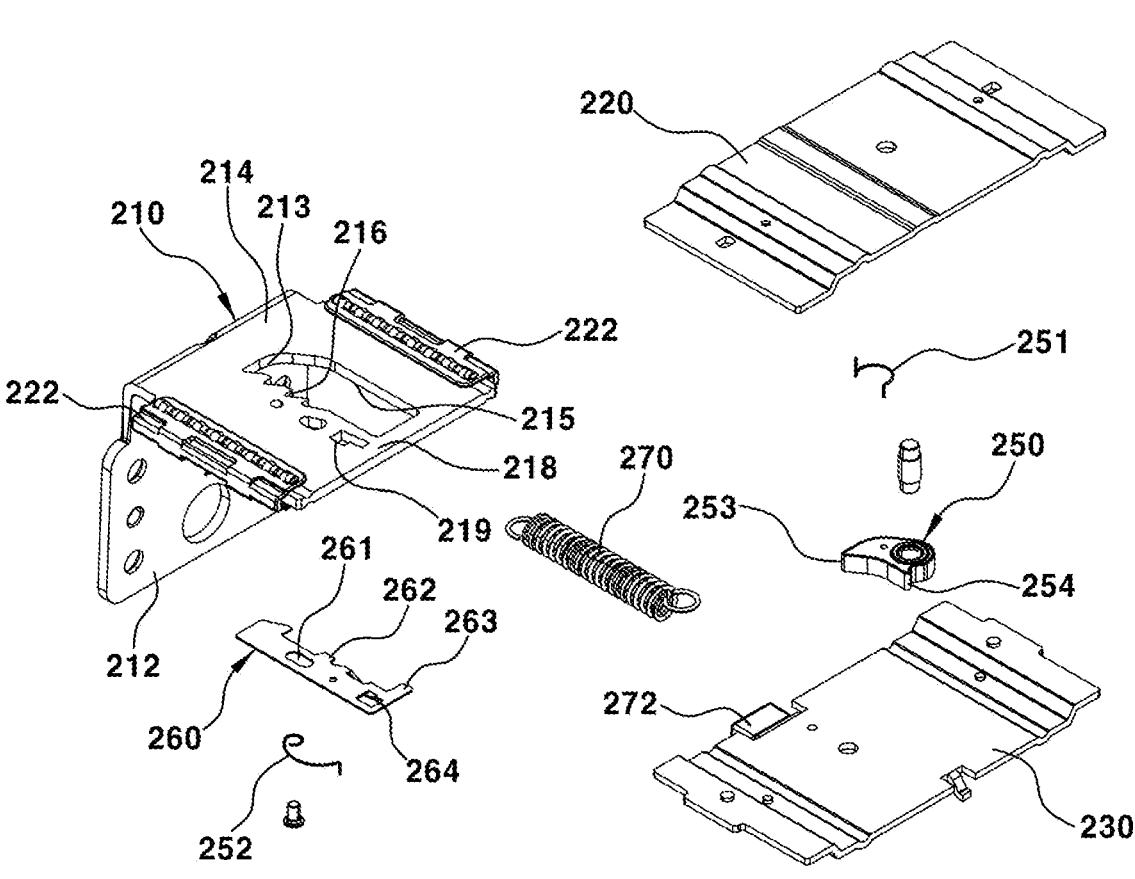
FIG. 14 is an exploded perspective view of the sliding device of the parallel type headrest position adjustment apparatus according to the other embodiment of the present disclosure.

For this operation, as clearly seen from FIG. 14, the moving plate 210 according to the other embodiment of the present disclosure is constituted by a mounting plate 212 mounted to the support frame 120 of the headrest pad device 100, and a sliding plate 214 bent from an upper end of the mounting plate 212 in the rearward direction. In addition, the fixed plate 240 according to the other embodiment of the present disclosure is constituted by an upper plate 242 mounted to a lower surface of the front portion of the reciprocation guide 310, and a lower plate 244 bent from a rear end of the upper plate 242 in the downward direction and mounted to the front portion of the reciprocation guide 310 exposed through the front opening portion of the reciprocator 300 in a state in which a rear end of the lower bracket 230 is stacked on the reciprocation guide 310.

Preferably, ball bearing rails 222, into which opposite ends of the sliding plate 214 of the moving plate 210 are slidably inserted, are mounted in a space between the upper bracket 220 and the lower bracket 230, that is, the slide space 221, at opposite lateral positions of the slide space 221, in order to enable smooth sliding movement of the moving plate 210 in the forward/rearward direction.

A slide hole 215, which extends lengthily in the forward/rearward direction, is formed at the sliding plate 214 of the moving plate 210, and multistage tooth grooves 216 are formed at one-side inner surface of the slide hole 215.

In particular, a ratchet 250 is rotatably mounted to the upper bracket 220 under the upper bracket 220, and is disposed within the slide hole 215 of the sliding plate 214, in order to restrain forward/rearward movement of the moving plate 210, thereby locking a position of the moving plate 210.

The ratchet 250 has a structure in which a locking protrusion 253 protruding in one direction is formed at a front end of the ratchet 250, and an unlocking protrusion 254 protruding in the other direction is formed at a rear end of the ratchet 250.

Accordingly, as the ratchet 250 is selectively engaged in one of the multistage tooth grooves 216 in a state in which the ratchet 250 is rotatably disposed within the slide hole 215 of the sliding plate 214, forward/rearward position adjustment of the moving plate 210 may be achieved.

Meanwhile, when it is desired to rearwardly move the headrest pad device 100 to an original position in a state in which the headrest pad device 100 has been adjusted in position through forward movement thereof, unlocking causing the ratchet 250 to be disengaged from the engaged tooth groove 216 should be performed.

For this operation, that is, for unlocking causing the ratchet 250 to be disengaged from the engaged tooth groove 216, a ratchet-unlocking plate spring 260 configured to rotate the ratchet 250 in an unlocking direction is rotatably coupled to a rotating pin 217 formed at a lower surface of the sliding plate 214.

As clearly seen from FIGS. 16A to 16H, the ratchet-unlocking plate spring 260 is fabricated to have a rectangular plate shape, and has a structure in which a slot 261, into which the rotating pin 217 formed at the sliding plate 214 is inserted, is formed at a rotation center portion of the ratchet-unlocking plate spring 260, a pressing groove 262 is formed at a middle portion of an inner surface of the ratchet-unlocking plate spring 260 such that the pressing groove 262 is able to overlap with a rearmost one of the multistage tooth grooves 216, and an unlocking end 263 contacting the unlocking protrusion 254 of the ratchet 250 is formed at a rear end portion of the inner surface of the ratchet-unlocking plate spring 260, to protrude from the rear end portion.

In addition, a rotation restraining protrusion 264 is formed at a rear end of the ratchet-unlocking plate spring 260, and an inner hole 218 and an outer hole 219, into which the rotation restraining protrusion 264 is selectively inserted for engagement therewith, are formed at the sliding plate 214 such that the inner hole 218 and the outer hole 219 are vertically arranged while communicating with each other.

In this case, the inner hole 218 is formed to extend linearly in the forward/rearward direction, and the outer hole 219 is formed to extend linearly in a lateral direction, and, as such, the inner hole 218 and the outer hole 219 communicate with each other while being vertically arranged.

Meanwhile, an arch surface 213 having an arch shape similar to that of the front end of the ratchet 250 is formed at a front end of the slide hole 215 of the sliding plate 214. Accordingly, when the sliding plate 214 moves rearwards, a curved surface of the front end of the ratchet 250 is brought into contact with the arch surface 213, thereby guiding downward rotation of the ratchet 250. As a result, the locking protrusion 253 of the ratchet 250 is again inserted into a foremost one of the multistage tooth grooves 216.

Preferably, a first spring 251 configured to exert elastic restoring force to rotate the ratchet 250 toward the tooth grooves 216 is connected between the upper bracket 220 and the ratchet 250, and a second spring 252 configured to exert elastic restoring force to rotate the ratchet-unlocking plate spring 260 in an outward direction toward the outer hole 219 is connected between the rotating pin 217 of the sliding plate 214 and the ratchet 250.

In addition, a return spring 270 configured to provide elastic restoring force in the rearward direction when the moving plate 210 moves in the rearward direction together with the headrest pad device 100 is connected between the mounting plate 212 of the moving plate 210 and a rear end of the lower bracket 230. Accordingly, the moving plate 210 may be rapidly moved to a rearmost position by the elastic restoring force of the return spring 270.

Preferably, a stopper 272 configured to contact a rear surface of the mounting plate 212 of the moving plate 210 is mounted to a front end of the lower bracket 230. Accordingly, when the moving plate 210 moves rearwards to the rearmost position, the mounting plate 212 is brought into contact with the stopper 272 in an impact-dampened manner. Thus, the maximum rearward movement distance of the moving plate 210 is limited, and impact generated when the moving plate 212 moves rearwards may be dampened.

Hereinafter, operation flow of the parallel type headrest position adjustment apparatus according to the other embodiment of the present disclosure for forward/rearward position adjustment of the headrest will be described.

Figure 15:
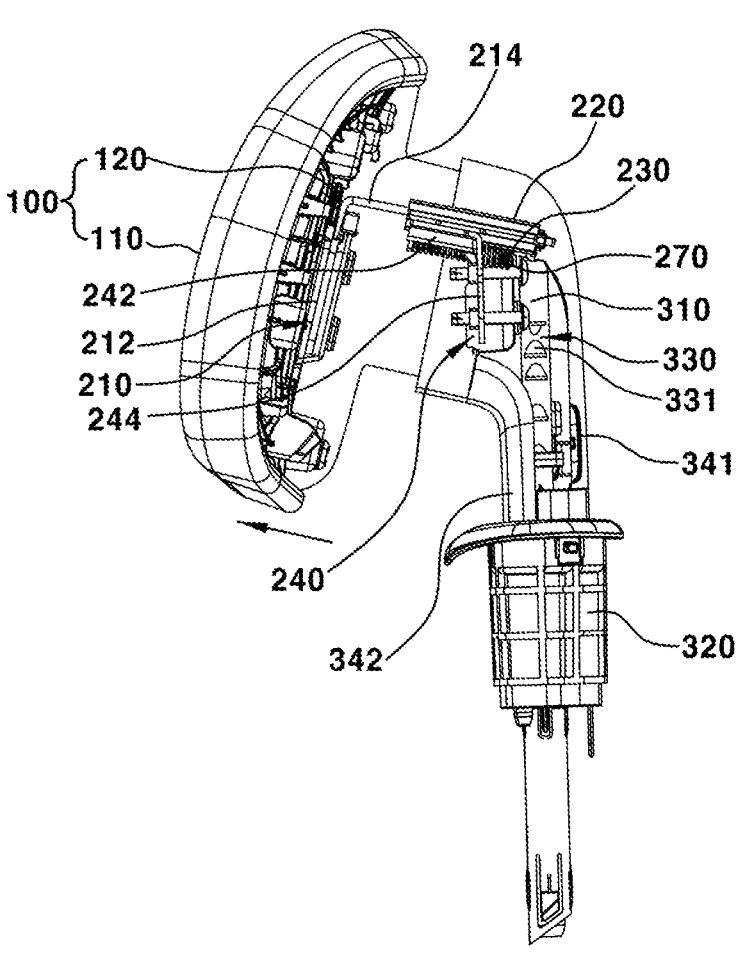
FIG. 15 is a side view showing a state in which a position of the headrest is adjusted to shift forwards by the parallel type headrest position adjustment apparatus according to the other embodiment of the present disclosure.

FIG. 15 is a side view showing a state in which a position of the headrest is adjusted to shift forwards by the parallel type headrest position adjustment apparatus according to the other embodiment of the present disclosure. FIGS. 16A to 16H are plan views showing operation flow of the sliding device when the headrest of the parallel type headrest position adjustment apparatus according to the other embodiment of the present disclosure is adjusted in position in the forward or rearward direction.

As described above, the mounting plate 212 of the moving plate 210 is in a state of being mounted to the support frame 120 of the headrest pad device 100 and, as such, the headrest pad device 100 and the moving plate 210 may simultaneously move forwards or rearwards.

Figure 16A:
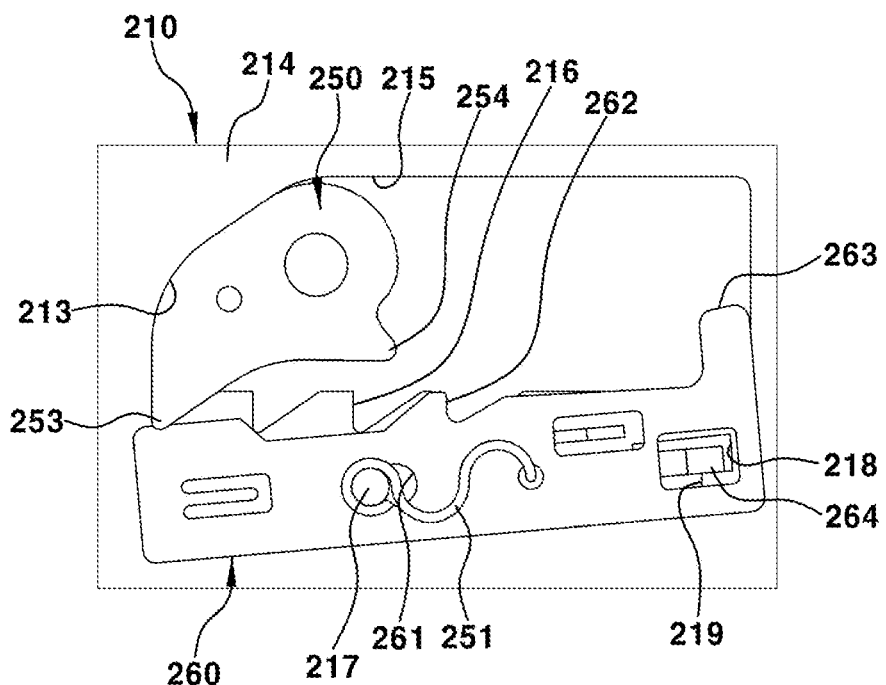
FIGS. 16A to 16H are plan views showing operation flow of the sliding device when the headrest of the parallel type headrest position adjustment apparatus according to the other embodiment of the present disclosure is adjusted in position in a forward or rearward direction.

Referring to FIG. 16A, when the headrest pad device 100 and the moving plate 210 move maximally rearwardly, the locking protrusion 253 of the ratchet 250 is inserted into the foremost one of the multistage tooth grooves 216, and is maintained in the inserted state.

In this case, the rotation restraining protrusion 264 formed at a rear end of the ratchet-unlocking plate spring 260 is inserted into the inner hole 218 formed at the sliding plate 214 and, as such, the ratchet-unlocking plate spring 260 is disposed in a state of being inclined at a predetermined angle.

Figure 16B:
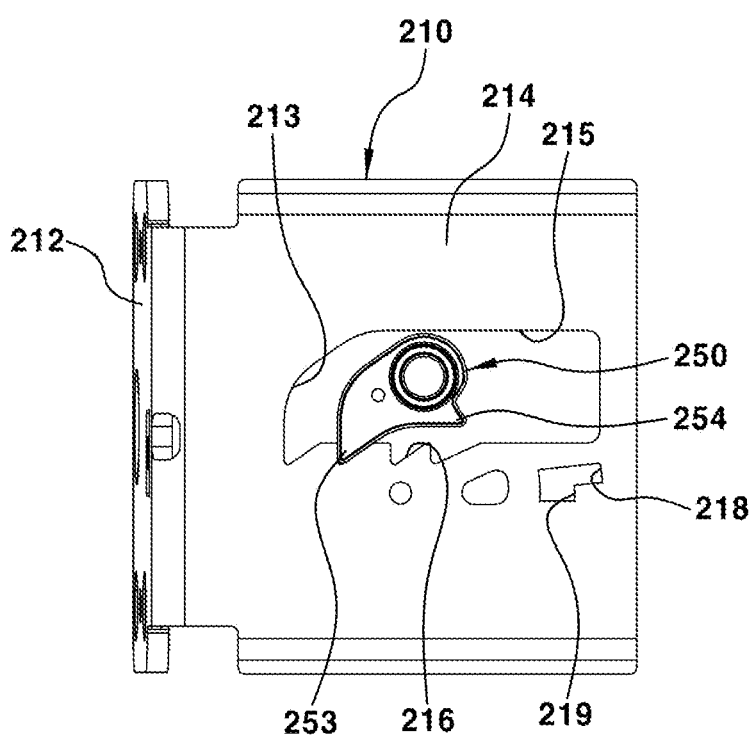
Figure 16C:
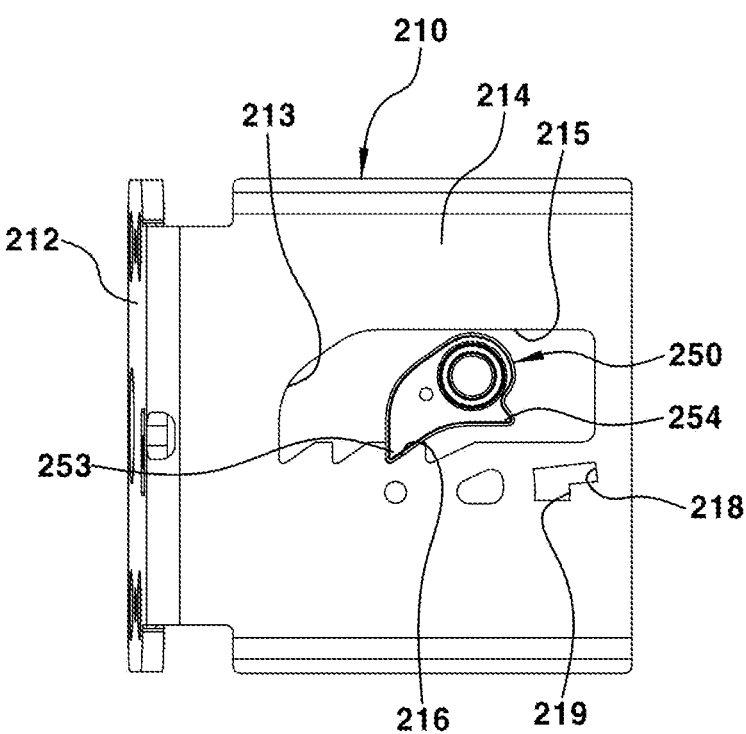
Figure 16D:
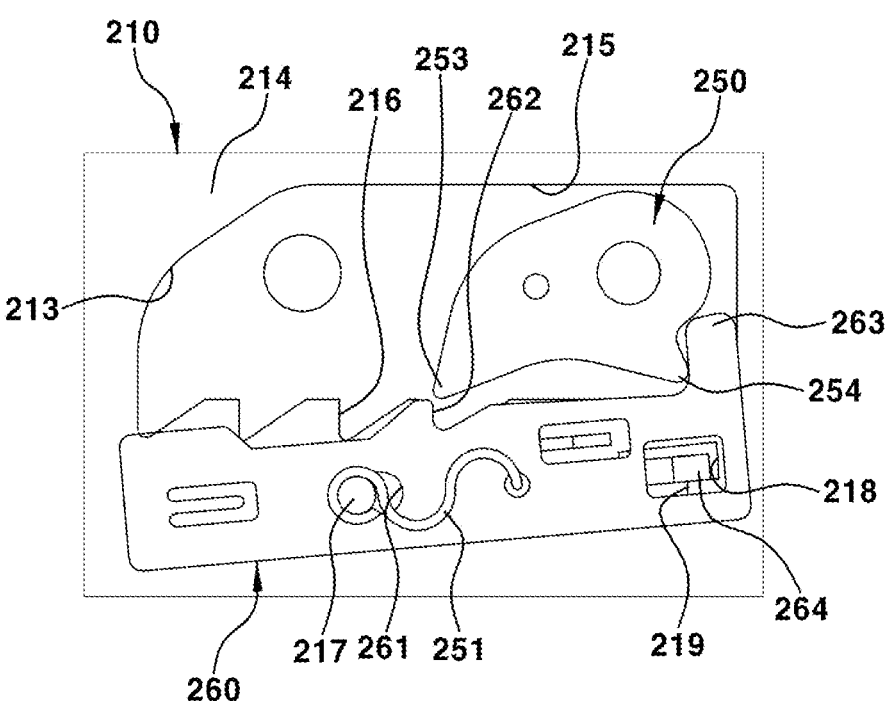

When the user subsequently pulls the headrest pad device 100 in the forward direction, the locking protrusion 253 of the ratchet 250 is sequentially moved from the foremost one of the multistage tooth grooves 216 to next ones of the multistage tooth grooves 216, as shown in FIGS. 16B and 16C. Thus, forward movement of the headrest pad device 100 is achieved.

In addition, when the user maximally pulls the headrest pad device 100 in the forward direction, the unlocking protrusion 254 of the ratchet 250 is brought into contact with the unlocking end 263 of the ratchet-unlocking plate spring 260, thereby causing the ratchet 250 to rotate in a clockwise direction (with reference to the orientation of FIG. 16D) by a predetermined angle. As a result, a curved surface of the rear end of the ratchet 250 is engaged with a tip of the unlocking end 263, thereby preventing the ratchet 250 from rotating beyond the predetermined angle.

Figure 16E:
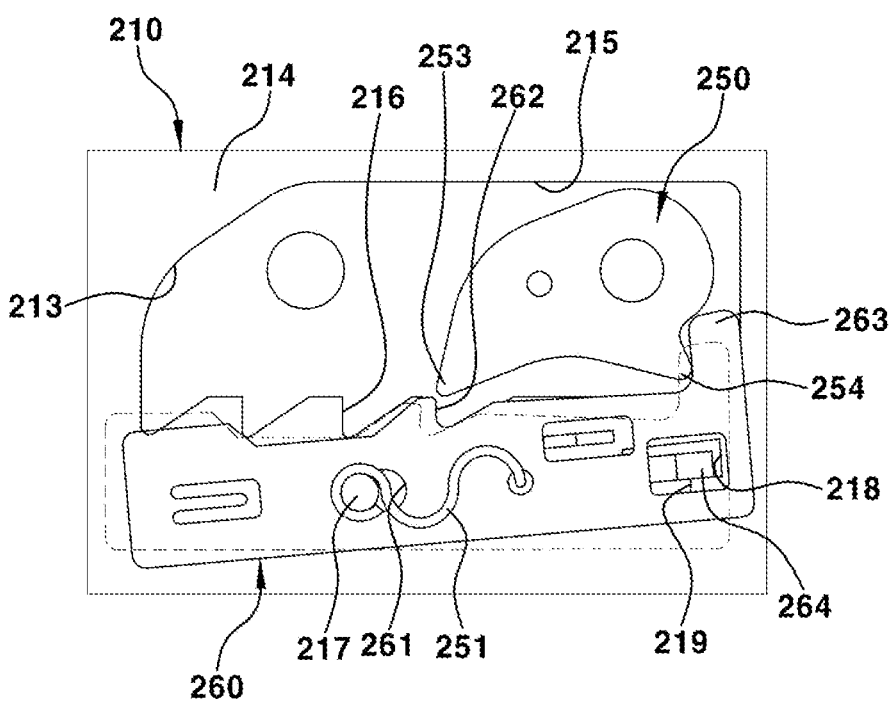

After the ratchet 250 rotates in the clockwise direction by the predetermined angle, the ratchet 250 subsequently again rotates in a counterclockwise direction by elastic restoring force of the first spring 251. As a result, the locking protrusion 253 of the ratchet 250 is inserted into the rearmost one of the multistage tooth grooves 216, and, at the same time, is inserted into the pressing groove 262 of the ratchet-unlocking plate spring 260, as shown in FIG. 16E.

When the locking protrusion 253 of the ratchet 250 is inserted into the pressing groove 262 the ratchet-unlocking plate spring 260, as described above, the locking protrusion 253 pushes the ratchet-unlocking plate spring 260 in the forward direction. As a result, the rotating pin 217 formed at the sliding plate 214 is moved rearwards along the slot 216 formed at the rotation center portion of the ratchet-unlocking plate spring 260, and the rotation restraining protrusion 264 formed at the rear end of the ratchet-unlocking plate spring 260 is separated from the inner hole 218 formed at the sliding plate 214, and is then inserted into the outer hole 219, as shown in FIGS. 16E and 16F.

Figure 16F:
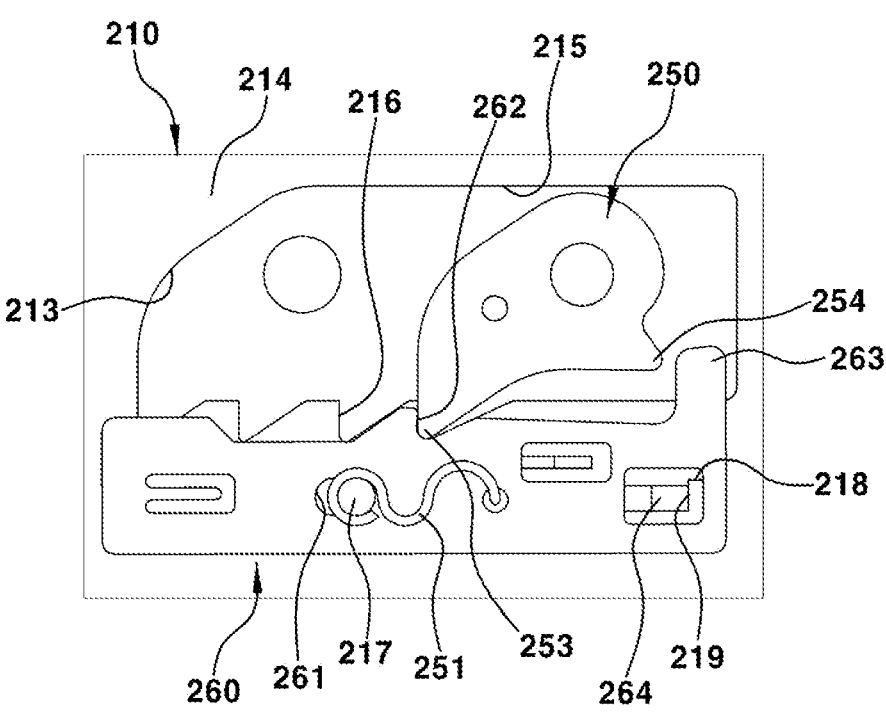

As the rotation restraining protrusion 264 of the ratchet-unlocking plate spring 260 is inserted into the outer hole 219 after being separated from the inner hole 218 of the sliding plate 214, as described above, the ratchet-unlocking plate spring 260 rotates in the clockwise direction by a predetermined angle and, as such, is linearly disposed in the forward/rearward direction without inclination, as shown in FIG. 16F.

In addition, as the locking protrusion 253 of the ratchet 250 is inserted into the rearmost one of the multistage tooth grooves 216, the position of the headrest pad device 100 is in a state of being adjusted to a foremost position, and the return spring 270 connected between the mounting plate 212 of the moving plate 210 and the rear end of the upper bracket 220 is in a maximally tensed state.

Meanwhile, when it is desired to move the headrest pad device 100 rearwards to an original position, unlocking causing the locking protrusion 253 of the ratchet 250 to be disengaged from the engaged tooth groove 216 should be performed.

Figure 16G:
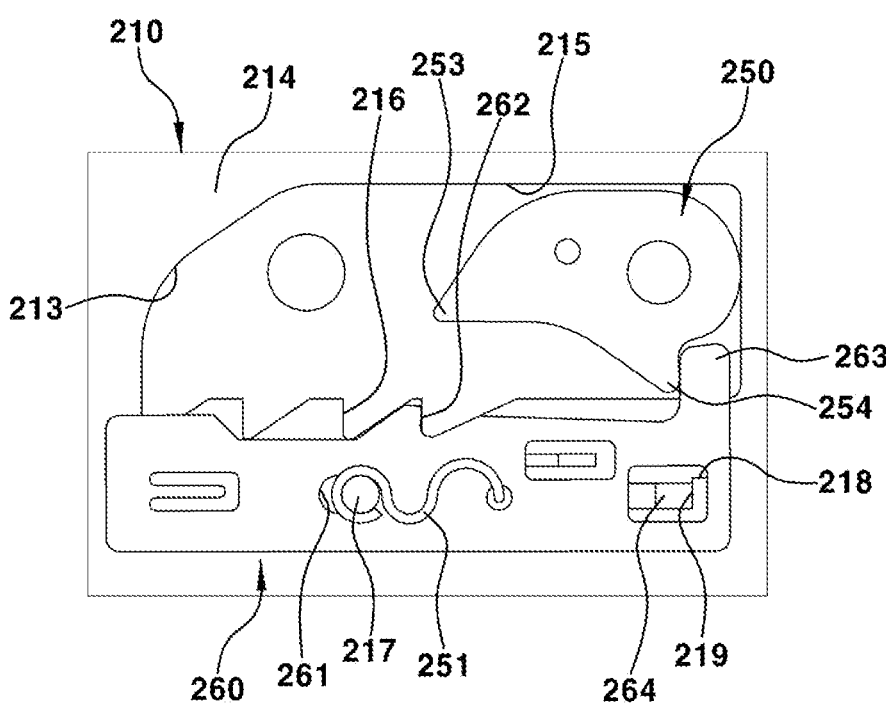

For this operation, the user again maximally pulls in the forward direction and, as such, the moving plate 210 and the ratchet-unlocking plate spring 260 move maximally in the forward direction, together with the headrest pad device 100. In this case, the unlocking end 263 of the ratchet-unlocking plate spring 260 pushes the unlocking protrusion 254 of the ratchet 250 in the forward direction. As a result, as shown in FIG. 16G, the ratchet 250 rotates maximally in the clockwise direction and, as such, unlocking causing the locking protrusion 253 of the ratchet 250 to be disengaged from the rearmost one of the multistage tooth grooves 216 is achieved.

When the user subsequently pushes the headrest pad device 100 in the rearward direction, the headrest pad device 100 and the moving plate 210 may return to the original positions thereof, that is, the rearmost positions thereof, respectively.

In more detail, the headrest pad device 100 and the moving plate 210 may rapidly move rearwards to the original positions thereof, that is, the rearmost positions thereof, respectively, before the locking protrusion 253 of the ratchet 250 is inserted into one tooth groove 216, by virtue of force of the user pushing the headrest pad device 100 in the rearward direction and elastic restoring force of the return spring 270.

Figure 16H:
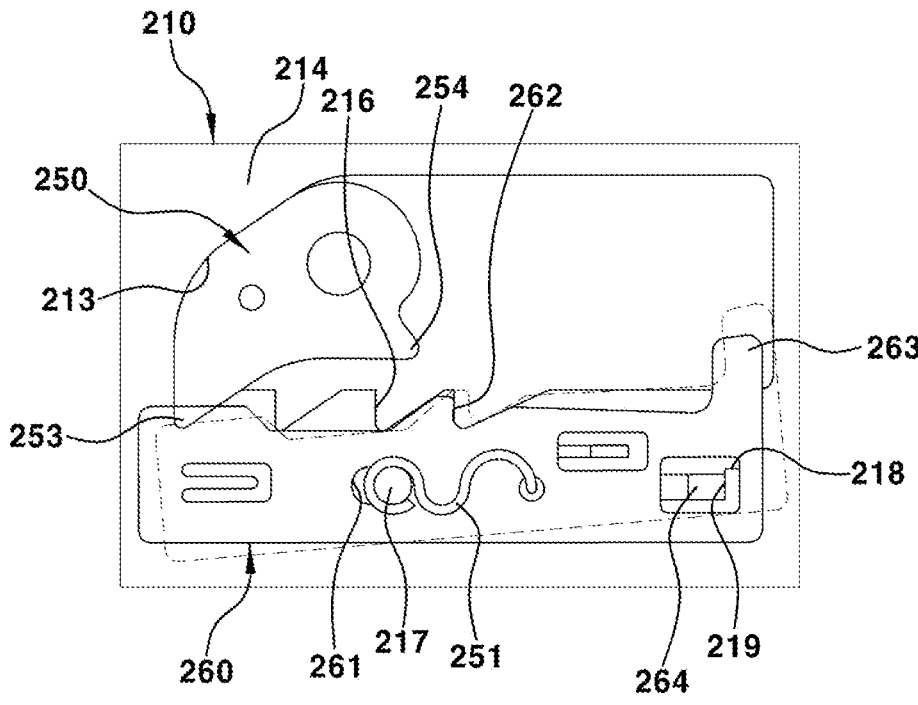

When the headrest pad device 100 and the moving plate 210 return to the original positions thereof, that is, the rearmost positions thereof, respectively, as described above, the curved surface of the front end of the ratchet 250 is brought into contact with the arch surface 213 of the sliding plate 214, thereby guiding downward rotation of the ratchet 250, as shown in FIG. 16H. In addition, the locking protrusion 253 of the ratchet 250 may be again inserted into the foremost one of the multistage tooth grooves 216.

In addition, when the locking protrusion 253 of the ratchet 250 may be again inserted into the foremost one of the multistage tooth grooves 216, the locking protrusion 253 downwardly presses the front end of the ratchet-unlocking plate spring 260, thereby causing the ratchet-unlocking plate spring 260 to rotate about the rotating pin 217 in the counterclockwise direction. As a result, the rotation restraining protrusion 264 of the ratchet-unlocking plate spring 260 is separated from the outer hole 219 of the sliding plate 214, and is then again inserted into the inner hole 218.

As the rotation restraining protrusion 264 of the ratchet-unlocking plate spring 260 is again inserted into the inner hole 218 of the sliding plate 214 after being separated from the outer hole 219 of the sliding plate 214, as described above, the ratchet-unlocking plate spring 260 is again disposed in a state of being inclined by the predetermined angle.

Thus, the distance between the head of the passenger and the headrest pad may be adjusted to a desired distance through adjustment of the position of the headrest pad device 100 not only in the upward/downward direction, but also in the forward/rearward direction, and, as such, it may be possible to enhance comfort performance and support performance of the headrest.

Hereinafter, a configuration and operation flow of the reciprocator of the parallel type headrest position adjustment apparatus according to the other embodiment of the present disclosure will be described with reference to FIGS. 17 to 20.

Figure 17:
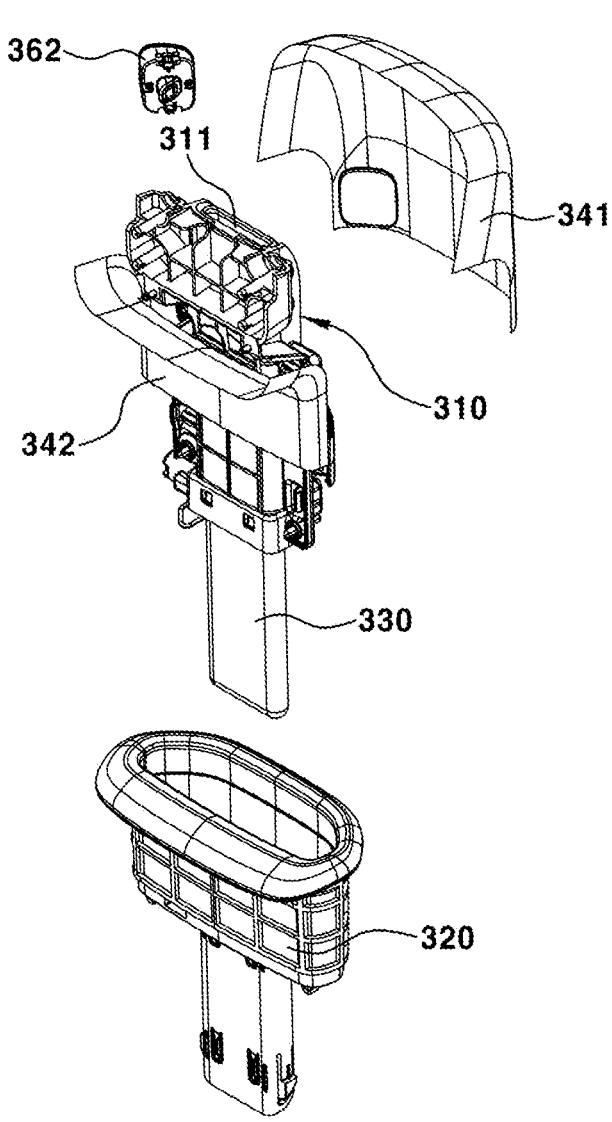
FIG. 17 is an exploded perspective view showing the reciprocator of the parallel type headrest position adjustment apparatus according to the other embodiment of the present disclosure.

The reciprocator 300 is configured to adjust a vertical height of the headrest pad device 100. As shown in FIG. 17, the reciprocator 300 is configured through inclusion of a hollow fixed guide 320 mounted to an upper portion of the seatback in an inserted state, a mono-post 330 fixedly coupled to the fixed guide 320 in an inserted state, a reciprocation guide 310 configured to reciprocate along the mono-post 330, and a cover 340 attached to a rear portion and a lower portion of the reciprocation guide 310.

A plurality of locking grooves 331 is formed at an upper end of the mono-post 330 such that the locking grooves 331 are spaced apart from one another by a predetermined distance in the upward/downward direction. A lower end portion of the mono-post 330 is coupled to the fixed guide 320 in an inserted state.

As shown in FIG. 17, a reciprocation guide hole 311, into which the upper end of the mono-post 330 is inserted, is formed at the reciprocation guide 310 such that the reciprocation guide hole 311 extends through the reciprocation guide 310 in the upward/downward direction. Accordingly, the reciprocation guide 310 may reciprocate along the mono-post 330.

The cover 340 has a structure covering the rear portion and the lower portion of the reciprocation guide 310 while having a structure in which an opening 343 exposing the reciprocation guide 310 in the forward direction is formed at a front portion of the cover 340.

For example, as shown in FIG. 17, the cover 340 includes a rear cover 341 attached to the rear portion of the reciprocation guide 310, and a front cover 342 attached to the lower portion of the reciprocation guide 310. In a state in which the rear cover 341 is attached to the rear portion of the reciprocation guide 310, and the front cover 342 is attached to the lower portion of the reciprocation guide 310, the opening 343 exposing the reciprocation guide 310 in the forward direction may be formed at front portions of the rear cover 341 and the front cover 342, as shown in FIGS. 11 and 12.

In addition, the reciprocator 300 is configured through further inclusion of a locking device 350 mounted to the reciprocation guide 310 and configured to be selectively separably engaged with one of the locking grooves 331 of the mono-post 330.

Figure 18:
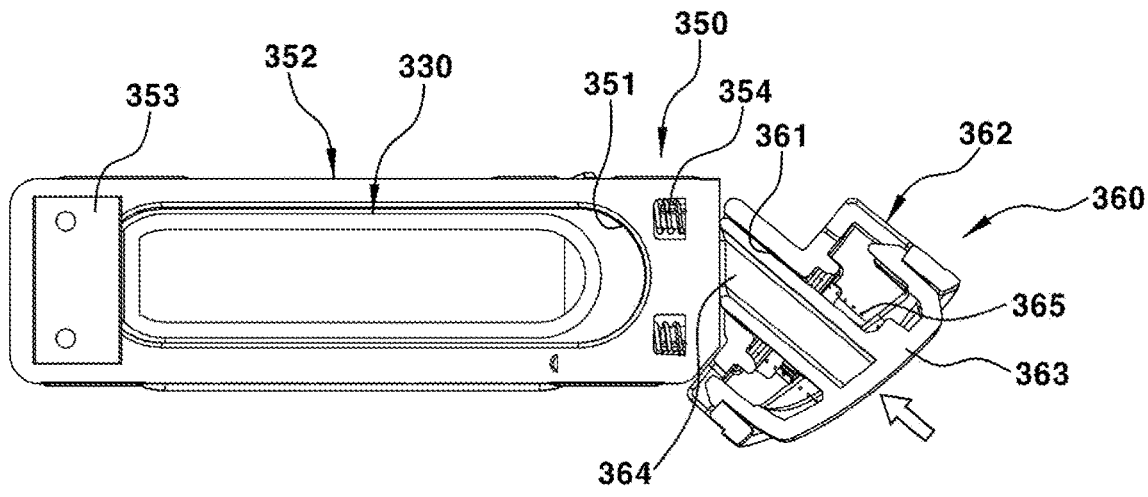
FIG. 18 is a sectional view showing a locking state of the reciprocator of the parallel type headrest position adjustment apparatus according to the other embodiment of the present disclosure.
Figure 19:
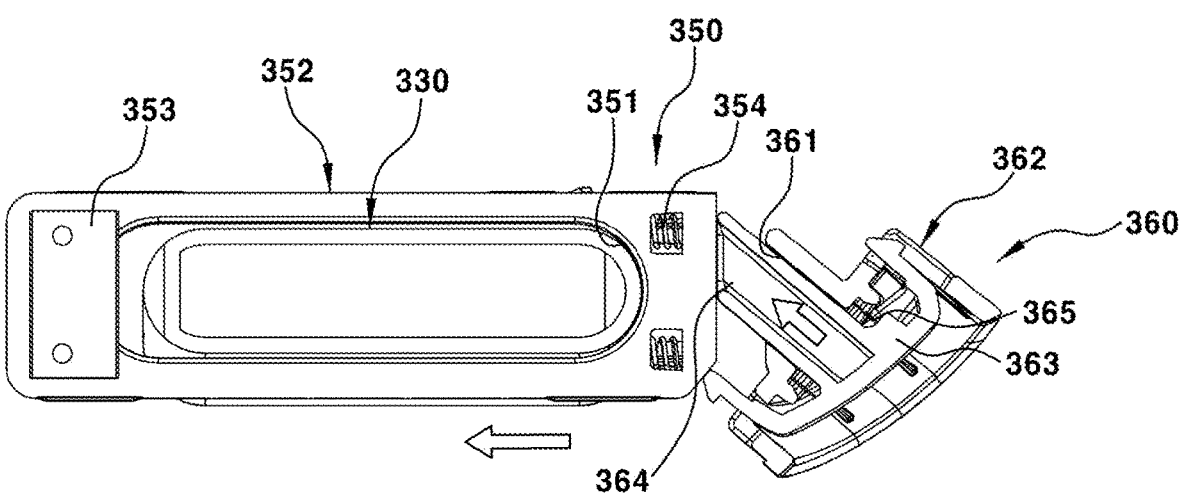
FIG. 19 is a sectional view showing an unlocking state of the reciprocator of the parallel type headrest position adjustment apparatus according to the other embodiment of the present disclosure.

As shown in FIGS. 17 to 19, the locking device 350 may be configured through inclusion of a bezel 352 formed with a through hole 351, through which the mono-post 330 extends, and mounted to the reciprocation guide 310 in an inserted state such that the bezel 352 is laterally movable, a locking plate 353 selectively separably engaged with one of the locking grooves 331 of the mono-post 330, a third spring 354 connected between the other end of the bezel 352 and an outer surface of the reciprocation guide 310, and an unlocking device 360 mounted to the cover 340 and configured to forcibly move the bezel 352 in an unlocking direction.

In addition, as shown in FIGS. 18 and 19, the unlocking device 360 may be constituted by a button guide 362 fixedly mounted to the cover 340 while having a structure formed with a pressing guide hole 361, a button 363 coupled to the button guide 362 in an inserted state such that the button 363 is allowed to be pressed, a pressing end 364 formed at an inner surface of the button 363 such that the pressing end 364 extends through the pressing guide hole 361 and contacts the other surface of the bezel 352, to press the other surface of the bezel 352, and a fourth spring 365 connected between the inner surface of the button 363 and an outer surface of the button guide 362.

In this case, the button 363 may be disposed at a predetermined position of the cover 340 such that the button 363 is allowed to be pressed.

Accordingly, when the user presses the button 363 in order to adjust a height of the headrest pad device 100, the pressing end 364 formed with the button 363 at the inner surface thereof moves forwards along the pressing guide hole 361 of the button guide 362, thereby pressing the other surface of the bezel 352, as shown in FIG. 18.

When the pressing end 364 presses the other surface of the bezel 352, the bezel 352 is moved in the unlocking direction, and, at the same time, the locking plate 353 is separated from one of the locking grooves 331 of the mono-post 330, as shown in FIG. 19.

When the user subsequently performs manipulation for moving the headrest pad device 100 in the upward direction or the downward direction, height adjustment of the headrest pad device 100 may be achieved.

Figure 20:
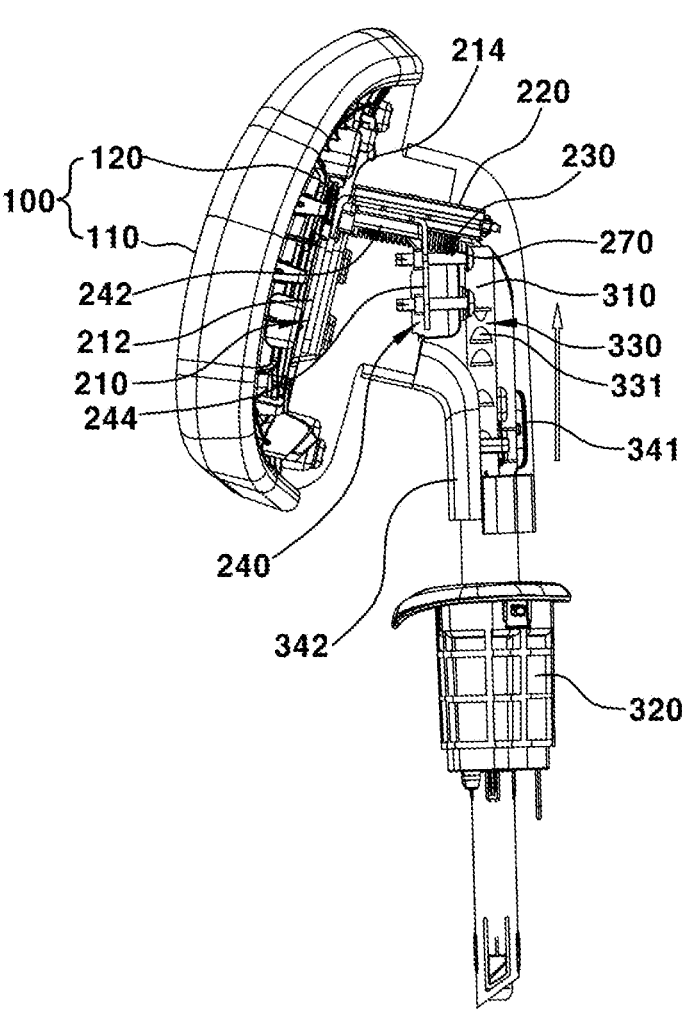
FIG. 20 is a side view showing a state in which a position of the headrest is adjusted to shift upwards by of the parallel type headrest position adjustment apparatus according to the other embodiment of the present disclosure.

In more detail, as the user subsequently performs manipulation for moving the headrest pad device 100 in the upward direction or the downward direction, the reciprocation guide 310 reciprocates along the mono-post 330 and, as such, the sliding device 200 connected to the reciprocation guide 210 and the headrest pad device 100 connected to the sliding device 200 may simultaneously reciprocate, as shown in FIG. 20. Accordingly, height adjustment of the headrest pad device 100 may be easily achieved.

Of course, when pressing force of the user applied to the button 363 is released, the button 363 is moved backwards to an original position thereof by elastic restoring force of the fourth spring 365, and the bezel 352 is moved in a locking direction by elastic restoring force of the third spring 354. As a result, the locking plate 352 is engaged with one of the locking grooves 331 of the mono-post 330 such that the locking plate 352 may be locked and, as such, the headrest pad device 100 is again locked at a desired height.

Thus, the height of the headrest pad device 100 is adjusted to a height at which the headrest pad device 100 easily supports the head of the passenger through adjustment of the position of the headrest pad device 100 not only in the upward/downward direction, but also in the forward/rearward direction, and, as such, it may be possible to enhance comfort performance and support performance of the headrest.

The present disclosure provides the following effects through the above-described configurations.

First, a sliding device configured to slidably move the headrest pad in the forward/rearward direction may be mounted between the back portion of the headrest pad and the front portion of the reciprocator such that the headrest pad, the sliding device, and the reciprocator are arranged in series. Accordingly, a serial type headrest having a structure having a great forward/rearward thickness and a small height, as compared to that of a parallel type headrest, may be provided.

Second, a sliding device configured to slidably move the headrest pad in the forward/rearward direction may be mounted between the back portion of the headrest pad and the upper portion of the reciprocator such that the headrest pad, the sliding device, and the reciprocator are arranged in parallel. Accordingly, a parallel type headrest having a slim structure having a small forward/rearward thickness and a great height, as compared to that of a serial type headrest, may be provided.

Third, it may be possible to select and assemble a serial type headrest or a parallel type headrest in accordance with inner space types, ceiling heights, and seat kinds of various vehicles.

Fourth, the distance between the head of the passenger and the headrest pad may be adjusted to a desired distance through adjustment of the position of the headrest pad not only in the upward/downward direction, but also in the forward/rearward direction, and, as such, it may be possible to enhance comfort performance and support performance of the headrest.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A headrest position adjustment apparatus for a vehicle seat, the headrest position adjustment apparatus comprising:
   a headrest pad device comprising a pad, and a support frame attached to a back portion of the pad;
   a reciprocator mounted to a seatback of the vehicle seat, the reciprocator configured to reciprocate in an upward/downward direction; and
   a sliding device mounted between a back portion of the support frame and a front opening portion of the reciprocator, the sliding device configured to slidably move the headrest pad device in a forward/rearward direction,
   wherein the headrest pad device, the sliding device, and the reciprocator are arranged in series.

2. The headrest position adjustment apparatus according to claim 1, wherein the sliding device comprises:
   a moving plate comprising a mounting plate mounted to the support frame, and a sliding plate bent from a lower end of the mounting plate in the rearward direction;
   a slide hole formed at the sliding plate;
   multistage tooth grooves formed at one-side inner surface of the slide hole;
   an upper bracket and a lower bracket vertically stacked while being jointed at opposite ends thereof, to form a slide space receiving the moving plate such that the moving plate is movable forwards and rearwards;
   ball bearing rails mounted in the slide space at opposite lateral positions of the slide space, to slidably receive opposite ends of the sliding plate, respectively;
   a ratchet rotatably mounted to the upper bracket under the upper bracket and formed, at a rear end thereof, with an unlocking protrusion, the ratchet being disposed within the slide hole and selectively engaged with one of the multistage tooth grooves, for locking;

a fixed plate comprising an upper plate mounted to a front portion of a reciprocation guide exposed through the front opening portion of the reciprocator, and a lower plate bent from a lower end of the upper plate in the forward direction and mounted to an upper surface of the upper bracket;

a ratchet-unlocking plate spring configured to rotate the ratchet in an unlocking direction and rotatably coupled to a rotating pin formed at a lower surface of the sliding plate; and a return spring mounted between the mounting plate of the moving plate and a rear end of the upper bracket, to provide elastic restoring force in a rearward movement direction of the moving plate.

3. The headrest position adjustment apparatus according to claim 2, wherein the ratchet-unlocking plate spring has a structure comprising a slot formed at a rotation center portion of the ratchet-unlocking plate spring, to receive the rotating pin formed at the sliding plate, a pressing groove formed at a middle portion of an inner surface of the ratchet-unlocking plate spring such that the pressing groove is able to overlap with a rearmost one of the multistage tooth grooves, and an unlocking end formed at a rear end portion of the inner surface of the ratchet-unlocking plate spring, to protrude from the rear end portion, such that the unlocking end contacts the unlocking protrusion of the ratchet.

4. The headrest position adjustment apparatus according to claim 3, wherein a rotation restraining protrusion is formed at a rear end of the ratchet-unlocking plate spring, and an inner hole and an outer hole are formed at the sliding plate such that the inner hole and the outer hole are vertically arranged while communicating with each other, to selectively receive the rotation restraining protrusion for engagement therewith.

5. The headrest position adjustment apparatus according to claim 2, wherein an arch surface having an arch shape identical to an arch shape of a front end of the ratchet is formed at a front end of the slide hole of the sliding plate.

6. The headrest position adjustment apparatus according to claim 2, wherein a stopper is mounted to a front end of the upper bracket, to contact a rear surface of the mounting plate of the moving plate.

7. The headrest position adjustment apparatus according to claim 1, wherein the reciprocator comprises:

a fixed guide mounted to an upper portion of a the seatback in an inserted state;

a mono-post formed, at an upper end thereof, with a plurality of locking grooves spaced apart from one another by a predetermined distance in the upward/downward direction, the mono-post being coupled, at a lower end thereof, to the fixed guide in an inserted state;

a reciprocation guide formed with a reciprocation guide hole receiving the upper end of the mono-post, to reciprocate along the mono-post;

a locking device mounted to the reciprocation guide, to be selectively separably engaged with one of the locking grooves of the mono-post; and a cover attached to a rear portion and a lower portion of the reciprocation guide, the cover having a structure comprising an opening formed at a front portion of the cover, to expose the reciprocation guide in the forward direction.

8. The headrest position adjustment apparatus according to claim 7, wherein the locking device comprises:

a bezel mounted to the reciprocation guide such that the bezel is laterally movable, the bezel having a structure comprising a through hole allowing the mono-post to extend therethrough;

a locking plate mounted to one end of the bezel, to be selectively separably engaged with one of the locking grooves;

a third spring connected between another end of the bezel and an outer surface of the reciprocation guide; and an unlocking device mounted to the cover, to forcibly move the bezel in an unlocking direction.

9. The headrest position adjustment apparatus according to claim 8, wherein the unlocking device comprises:

a button guide fixedly mounted to the cover while having a structure comprising a pressing guide hole;

a button coupled to the button guide in an inserted state such that the button is allowed to be pressed;

a pressing end formed at an inner surface of the button such that the pressing end extends through the pressing guide hole and contacts another surface of the bezel, to press the other surface of the bezel; and a fourth spring connected between the inner surface of the button and an outer surface of the button guide.

10. A vehicle comprising the headrest position adjustment apparatus of claim 1.

11. A headrest position adjustment apparatus for a vehicle seat, the headrest position adjustment apparatus comprising:

a headrest pad device comprising a pad, and a support frame attached to a back portion of the pad;

a reciprocator mounted to a seatback of the vehicle seat, the reciprocator configured to reciprocate in an upward/downward direction; and a sliding device stacked on an upper surface of the reciprocator and mounted between a back portion of the support frame and a front portion of the reciprocator, to slidably move the headrest pad device in a forward/rearward direction, wherein the headrest pad device, the sliding device, and the reciprocator are arranged in parallel.

12. The headrest position adjustment apparatus according to claim 11, wherein the sliding device comprises:

a moving plate comprising a mounting plate mounted to the support frame, and a sliding plate bent from an upper end of the mounting plate in the rearward direction;

a slide hole formed at the sliding plate;

multistage tooth grooves formed at one-side inner surface of the slide hole;

an upper bracket and a lower bracket vertically stacked while being jointed at opposite ends thereof, to form a slide space receiving the moving plate such that the moving plate is movable forwards and rearwards;

ball bearing rails mounted in the slide space at opposite lateral positions of the slide space, to slidably receive opposite ends of the sliding plate, respectively;

a ratchet rotatably mounted to the upper bracket under the upper bracket and formed, at a rear end thereof, with an unlocking protrusion, the ratchet being disposed within the slide hole and selectively engaged with one of the multistage tooth grooves, for locking;

a fixed plate comprising an upper plate mounted to a lower surface of the lower bracket, and a lower plate bent from a lower end of the upper plate in the downward direction and mounted to a front surface of the reciprocation guide in a stacked state of a rear end of the lower bracket on the reciprocation guide exposed through a front opening portion of the reciprocator;

a ratchet-unlocking plate spring configured to rotate the ratchet in an unlocking direction and rotatably coupled to a rotating pin formed at a lower surface of the sliding plate; and a return spring mounted between the mounting plate of the moving plate and the rear end of the lower bracket, to provide elastic restoring force in a rearward movement direction of the moving plate.

13. The headrest position adjustment apparatus according to claim 12, wherein the sliding device further comprises:

a first spring connected between the upper bracket and the ratchet, to exert elastic restoring force to rotate the ratchet toward the tooth grooves; and a second spring connected between the rotating pin and the ratchet, to exert elastic restoring force to rotate the ratchet-unlocking plate spring in an outward direction.

14. The headrest position adjustment apparatus according to claim 12, wherein the ratchet-unlocking plate spring has a structure comprising a slot formed at a rotation center portion of the ratchet-unlocking plate spring, to receive the rotating pin formed at the sliding plate, a pressing groove formed at a middle portion of an inner surface of the ratchet-unlocking plate spring such that the pressing groove is able to overlap with a rearmost one of the multistage tooth grooves, and an unlocking end formed at a rear end portion of the inner surface of the ratchet-unlocking plate spring, to protrude from the rear end portion, such that the unlocking end contacts the unlocking protrusion of the ratchet.

15. The headrest position adjustment apparatus according to claim 14, wherein a rotation restraining protrusion is formed at a rear end of the ratchet-unlocking plate spring, and an inner hole and an outer hole are formed at the sliding plate such that the inner hole and the outer hole are vertically arranged while communicating with each other, to selectively receive the rotation restraining protrusion for engagement therewith.

16. The headrest position adjustment apparatus according to claim 12, wherein an arch surface having an arch shape identical to an arch shape of a front end of the ratchet is formed at a front end of the slide hole of the sliding plate.

17. The headrest position adjustment apparatus according to claim 12, wherein a stopper is mounted to a front end of the lower bracket, to contact a rear surface of the mounting plate of the moving plate.

18. The headrest position adjustment apparatus according to claim 11, wherein the reciprocator comprises:

a fixed guide mounted to an upper portion of a the seatback in an inserted state;

a mono-post formed, at an upper end thereof, with a plurality of locking grooves spaced apart from one another by a predetermined distance in the upward/downward direction, the mono-post being coupled, at a lower end thereof, to the fixed guide in an inserted state;

a reciprocation guide formed with a reciprocation guide hole receiving the upper end of the mono-post, to reciprocate along the mono-post;

a locking device mounted to the reciprocation guide, to be selectively separably engaged with one of the locking grooves of the mono-post; and a cover attached to a rear portion and a lower portion of the reciprocation guide, the cover having a structure comprising an opening formed at a front portion of the cover, to expose the reciprocation guide in the forward direction.

19. The headrest position adjustment apparatus according to claim 18, wherein the locking device comprises:

a bezel mounted to the reciprocation guide such that the bezel is laterally movable, the bezel having a structure comprising a through hole allowing the mono-post to extend therethrough;

a locking plate mounted to one end of the bezel, to be selectively separably engaged with one of the locking grooves;

a third spring connected between another end of the bezel and an outer surface of the reciprocation guide; and an unlocking device mounted to the cover, to forcibly move the bezel in an unlocking direction.

20. The headrest position adjustment apparatus according to claim 19, wherein the unlocking device comprises:

a button guide fixedly mounted to the cover while having a structure comprising a pressing guide hole;

a button coupled to the button guide in an inserted state such that the button is allowed to be pressed;

a pressing end formed at an inner surface of the button such that the pressing end extends through the pressing guide hole and contacts another surface of the bezel, to press the other surface of the bezel; and a fourth spring connected between the inner surface of the button and an outer surface of the button guide.

* * * * *